United States Patent [19]

Yant et al.

[11] 4,050,985
[45] Sept. 27, 1977

[54] NUCLEAR REACTOR

[75] Inventors: Howard W. Yant, Greensburg; Karl W. Stinebiser, New Stanton; Gregory C. Anzur, Herminie, all of Pa.

[73] Assignee: Westinghouse Electric Corporation, Pittsburgh, Pa.

[21] Appl. No.: 505,891

[22] Filed: Sept. 13, 1974

[51] Int. Cl.² ............................................. G21C 15/26
[52] U.S. Cl. ....................................... 176/61; 176/37; 176/40; 176/87
[58] Field of Search ............ 176/61, 40, 50, 64, 176/87, 37

[56] References Cited

U.S. PATENT DOCUMENTS

| | | | |
|---|---|---|---|
| 3,060,111 | 10/1962 | Sherman et al. | 176/61 |
| 3,158,543 | 11/1964 | Sherman et al. | 176/61 |
| 3,208,913 | 9/1965 | Hewnig | 176/61 |
| 3,486,973 | 12/1969 | Georges et al. | 176/61 |
| 3,802,992 | 4/1974 | Griffith et al. | 176/61 |

OTHER PUBLICATIONS

PMC-74-01, Proceedings of the Breeder Reactor Corporation, Jan. 1974, pp. 86-92.
"Nuclear Engineering Handbook", Etherington, McGraw Hill Book Co., New York, (1958), pp. 10-66.

*Primary Examiner*—Samuel W. Engle
*Assistant Examiner*—S. A. Cangialosi
*Attorney, Agent, or Firm*—Edward L. Levine; Z. L. Dermer

[57] ABSTRACT

A nuclear reactor, particularly a liquid-metal breeder reactor, whose upper internals include outlet modules for channeling the liquid-metal coolant from selected areas of the outlet of the core vertically to the outlet plenum. The modules are composed of a highly-refractory, high corrosion-resistant alloy, for example, INCONEL-718. Each module is disposed to confine and channel generally vertically the coolant emitted from a subplurality of core-component assemblies. Each module has a grid with openings, each opening disposed to receive the coolant from an assembly of the subplurality. The grid in addition serves as a holdown for the assemblies of the corresponding subplurality preventing their excessive ejection upwardly from the core. In the region directly over the core the outlet modules are of such peripheral form that they nest forming a continuum over the core-component assemblies whose outlet coolant they confine. Each subassembly includes a chimney which confines the coolant emitted by its corresponding subassemblies to generally vertical flow between the outlet of the core and the outlet plenum. Each subplurality of assemblies whose emitted coolant is confined by an outlet module includes assemblies which emit lower-temperature coolant, for example, a control-rod assembly, or fertile assemblies, and assemblies which emit coolant of substantially higher temperature, for example, fuel-rod assemblies. The coolants of different temperatures are mixed in the chimneys reducing the effect of stripping (hot-cold temperature fluctuations) on the remainder of the upper internals which are composed typically of AISI-304 or AISI-316 stainless steel.

7 Claims, 28 Drawing Figures

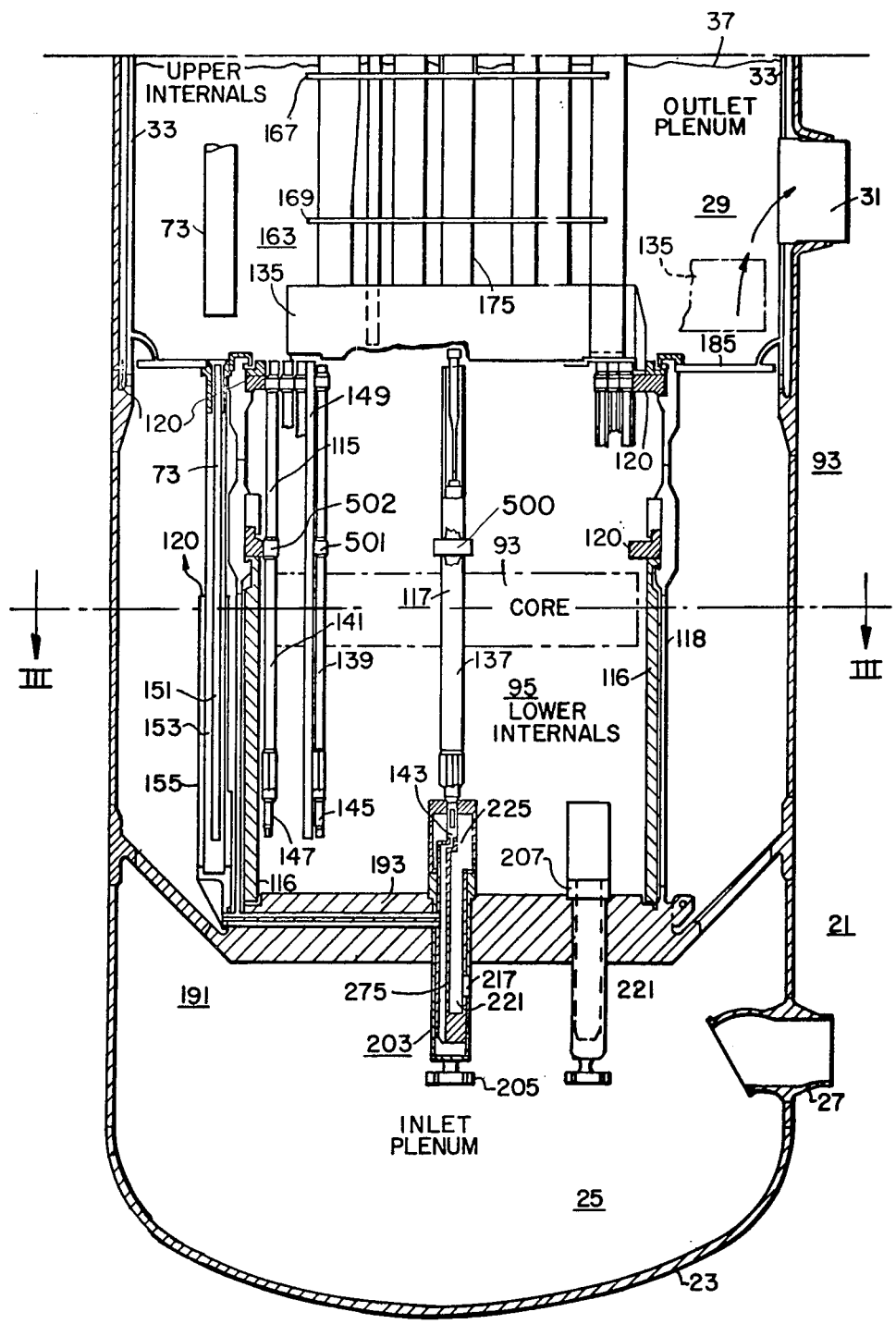
FIG. IB

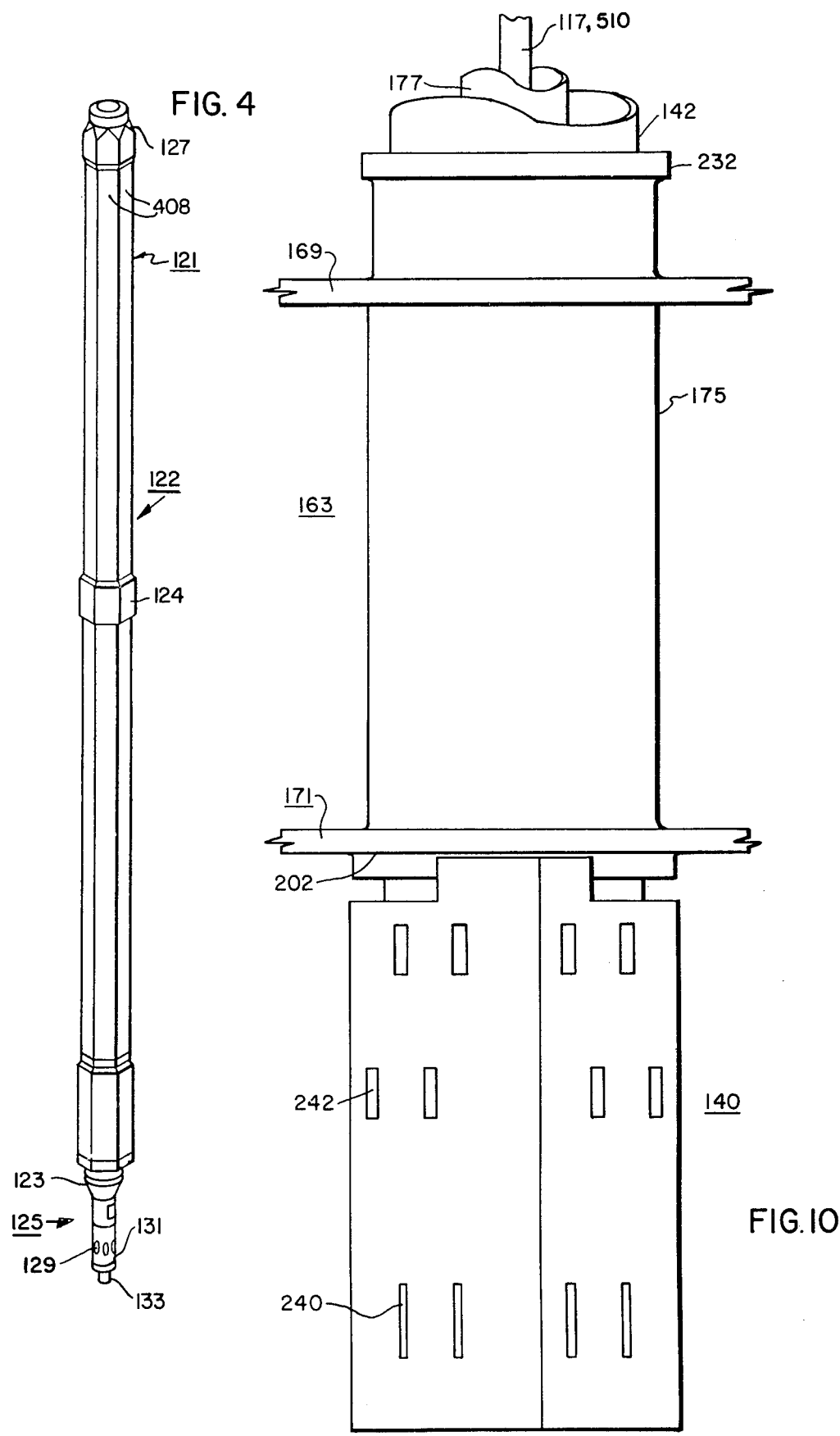

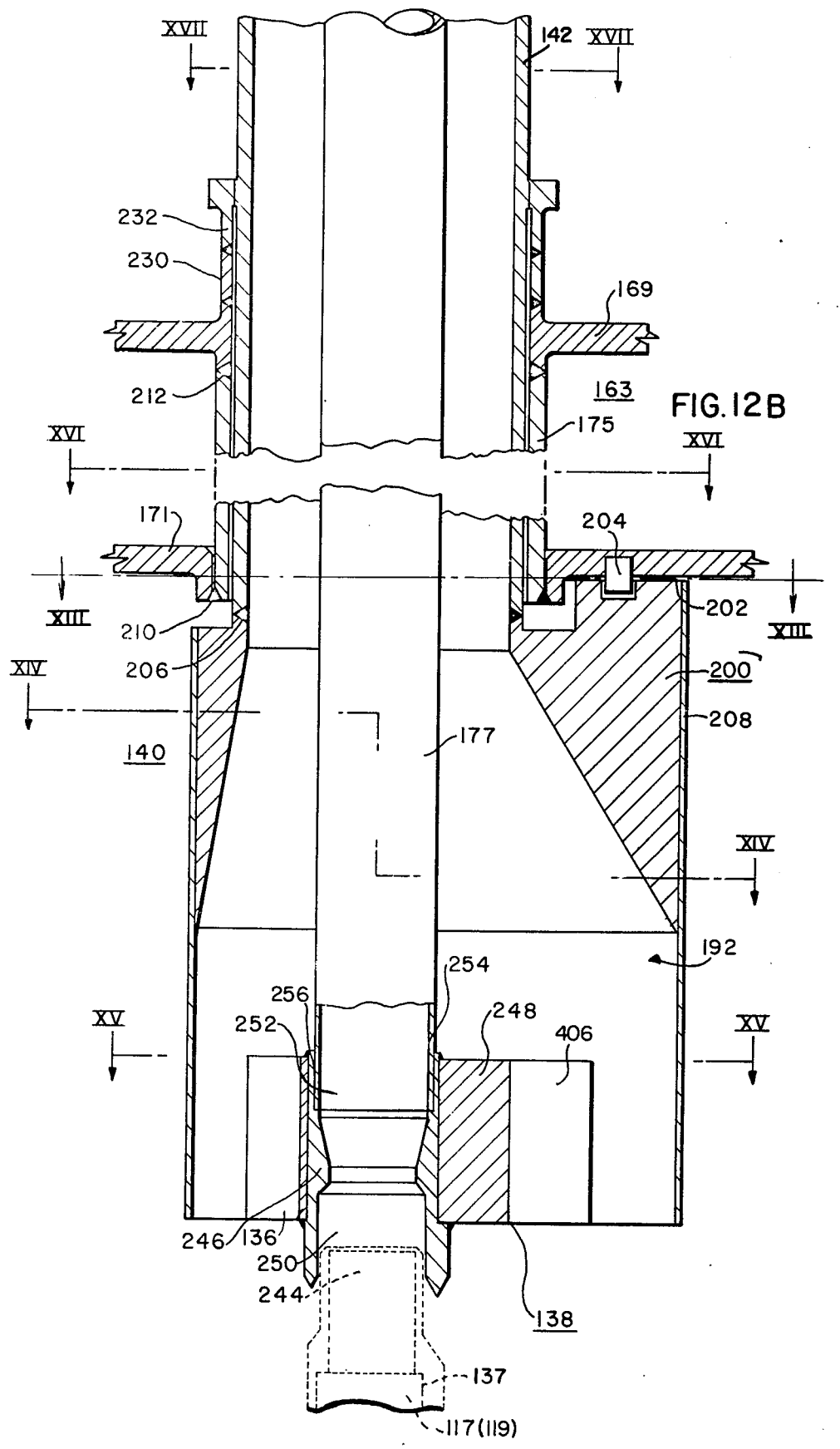

NUCLEAR REACTOR

This invention was made in the course of, or under, a contract with the U.S. Energy Research and Development Administration (ERDA), the successor in interest to the U.S. Atomic Energy Commission.

CROSS-REFERENCE TO RELATED APPLICATIONS

This application relates to, and incorporates by reference, each of the following applications, all assigned to Westinghouse Electric Corporation:

1. Application Ser. No. 503,148 filed, Sept. 4, 1974, now abandoned to W. E. Pennell and W. J. Rowan (herein called Pennell application) for Nuclear Reactor (Case 45,498).
2. Application Ser. No. 503,149 filed Sept. 4, 1974, now abandoned to John A. Rylatt (herein called Rylatt application) for Nuclear Reactor (Case 45,500).
3. Application Ser. No. 505,890 filed Sept. 13, 1974 to Edward W. Ference, J. Houtman, and R. Waldby (herein called Ference application) for Nuclear Reactor (Case 45,499).

BACKGROUND OF THE INVENTION

This invention relates to the art of nuclear reactors and has particular relationship to the upper-internals structure of nuclear reactors. A nuclear reactor includes a pressure vessel into which a heat-transfer fluid, typically liquid sodium for fast breeder reactors, or pressurized or boiling water for more conventional commercial reactors, is pumped under pressure. The fluid flows through the core and is heated; the hot fluid emerges from the vessel and the heat flows via mechanically separated primary and secondary loops to electrical-power generating equipment. Within the vessel there is supporting structure for the core components. Typically, for a liquid-cooled fast breeder nuclear reactor which generates more fissile fuel than it burns up, these components include fuel-rod bundles or assemblies, control-rod assemblies, blanket fertile-material or fertile-rod assemblies and removable radial shielding assemblies. The expression "core assemblies" or "core component assemblies" or the word "assembly," when used in this application with reference to components of the core, means one or more types of these assemblies. The core-support structure serves the purposes of locating, supporting, distributing coolant to, and providing axial and radial restraint for, these assemblies.

The core component assemblies, which in the illustrated embodiment include fuel assemblies, of both fissile and fertile fuel-containing types, control-rod assemblies and shielding assemblies, which form the core of a liquid metal-cooled fast-breeder nuclear reactor, are separately supported in inlet-support modules or modular units. Each inlet-support modular unit is removably mounted, held only by gravity, in liners in the lower core-support structure with fluid seals interposed between the aligned fluid inlet openings in the module and liner and the upper and lower parts of the module and liner. Each module directs flow of the heat-transfer or coolant fluid to a plurality (typically 7) of reactor component assemblies which are removably mounted, held only by gravity, in receptacles of the corresponding modular unit. Below the seal each module is subjected to low pressure which balances the low pressure in the region where the fluid emerges from the core components. The low pressure in the volume below the module lower seal is generated and maintained by venting this volume to the low pressure regions of the vessel of the reactor. Gravity is adequate to hold the modules in the liner.

Typically, this invention applies to a 975 Megawatts-thermal (Mwt) 400 Mwt.-electrical (Mwe) liquid-metal cooled fast-breeder reactor which has 198 hexagonal-core fuel assemblies surrounded by 150 radial blanket assemblies and 324 radial shield assemblies. In this typical reactor the assemblies are received in 61 inlet modules each having 7 receptacles. The velocity of the heat-transfer or cooling fluid, which is sodium, and its distribution varies with the character of the component or assembly which it cools. The velocity is about 30 feet per second in non-replaceable components while in replaceable components it may be as high as 50 feet per second at the inlet-lower-temperature end and 40 feet per second at the outlet-higher-temperature end. In the fuel rod bundles or assemblies it is 25 feet per second. Eighty percent of the fluid is allocated to the core, 12% to the radial blanket, 1.6% to control assemblies, and the remainder to shielding, bypass and leakage.

Typically a reactor of the type to which this invention relates, for example, a sodium-cooled breeder reactor, operates at a bulk coolant temperature differential of 300° F or greater, between the core inlet and core outlet. This temperature gradient is not uniform across the core; it fluctuates widely and has one major peak in temperature across the core caused by core geometry. Localized temperature variations may also occur by reason of local anomalies in the core such as fuel "burnup," deliberate variations in fuel enrichment, and control assemblies. Also, typically, a sodium-cooled breeder reactor undergoes rapid and severe changes in the core outlet temperature because of rapid changes in power load-level during postulated 'upset' events such as reactor trips, rapid unloading, etc.

The structure within the reactor vessel above the core, variously called instrument trees, upper-core support structures, or upper-internals structure, or upper internals as it is called in this application, provides primary or secondary 'holddown' of the reactor core for the contingency that the gravity holddown fails due to loss of the low pressure 'balance' as explained above during emergencies such as scram and also supports the control-rod drivelines and instrumentation. These upper internals are exposed to the core effluent flow, thermal gradients, thermal transient conditions and periodic "stripping" of hot and cold coolant streams. The word "stripping" means the overlap in temperature which occurs between adjacent parts of a reactor, for example adjacent core-component assemblies, which operate at widely different temperatures. The resulting thermal stress and thermal fatigue may reduce the design lifetime of upper-internals structures, which are normally designed for a lifetime equal to that of the reactor itself.

In accordance with the teachings of the prior art an attempt has been made to mitigate the effects of the stresses produced by the sharp differences and fluctuations in temperature by providing the upper internals, typically of a sodium-cooled breeder reactor, with a massive plate or structures (typically about 5 tons in weight) which serves both as holddown for the core-component assemblies and also to transmit the coolant from the outlet of the core. This plate has separate openings for the effluent from each of the core-component assemblies. Each opening has a thermal liner or sleeve whose purpose is to mitigate transient rates or changes in temperature. This prior-art structure is not satisfactory.

It is an object of this invention to provide a nuclear reactor having upper internals which shall effectively mitigate the thermal stress and thermal fatigue resulting from the temperature differences and temperature fluctuations of the effluent from the outlet of the core and shall assure a lifetime of the upper internals at least equal to the lifetime of the reactor itself.

SUMMARY OF THE INVENTION

This invention arises from the realization that while the prior-art holddown plate with holes having thermal liners may to an extent reduce the stresses arising from transient rates or changes in temperature, it does not reduce appreciably the effects of steady-state radial or localized temperature gradients. Such temperature gradients are high. The coolant passing through the holddown plate is in intimate contact with the control-assembly drive lines, supporting columns and instrumentation and the sharp steady-state thermal differences with resultant stripping have a devastating effect on these components materially reducing their lifetime.

To assure a reasonable or long lifetime for a reactor, the core-outlet liquid-metal flow streams are, in accordance with this invention, mixed as they are delivered at the core outlet. This mixing reduces thermal gradients between flow streams at widely different temperatures and isolates the remaining structure of the upper internals from direct impingement by the flow streams, reducing the rate of change for thermal transient events. The mixing is effected by outlet modules, each outlet module serving a plurality of core-component assemblies. These outlet modules collect effluent coolant from the core assemblies and duct it through the above core structure to the reactor outlet plenum. The assemblies, whose coolant at least some of the outlet modules transmit, emit coolant at widely different temperatures. For example, one of these modules may transmit coolant from a control-rod assembly surrounded by a number of fuel rod assemblies. Each outlet module includes a support or 'holddown' grid, a flow collector, a chimney, and thermal liners or stubs isolating each chimney from the other upper internals. The support grid is designed to avoid direct impingement of core effluent streams on neighboring parts of the upper internals and it limits the axial travel of the core assemblies below it, thus serving as "holddown" grid.

Each module is disposed to collect and confine through its grid, flow collector and chimney, the effluent from a subplurality of core-component assemblies. Each core-component assembly of this subplurality passes its emitted coolant through an opening in the grid and the lower edges of the walls of the grid serve to hold down the associated assembly. The thrust from any holddown assembly is absorbed by its flow collector which is relatively massive. Over the core the outlet modules are of such forms that their peripheries nest forming a continuum over the core-component assemblies whose coolant they conduct.

Core effluent is ducted from the flow collector of each outlet module through the upper internals by the chimneys. Each chimney and its thermal liners protect the upper core support structure from high cycle thermal transients. Flow mixing within the collector and chimney mix hot and cold streams entering the module, providing more even radial gradients between chimneys. The thermal isolation between chimney and 'structure" reduces the severity in rate of change for thermal transients due to core power level changes. It has been found that the mixing of high and low temperature jets of the liquid from the core starts immediately above the core and continues for some distances downstream towards the outlet plenum. Temperatures in these flow streams differ substantially and the mixing of these streams near the inner portion of the outlet modules results in a number of thermal stripping transients. The material selected for the modules must therefore have an endurance limit stress in excess of the maximum anticipated stress amplitude produced by fluid mixing. The part of the outlet module assembly which is subjected to these sharp temperature fluctuations is fabricated from alloys with superior cyclic thermal stress characteristics, while the remainder of the structure is made of relatively inexpensive material. Typically, the part of the assembly which is subject to sharp temperature variations is fabricated from the refractory corrosion-resistant nickel-chromium-iron alloy, INCONEL-718, and the other parts are fabricated from AISI-304 or 316 stainless steel. INCONEL-718 has the following typical composition in weight percent.

| | |
|---|---|
| Nickel | 50.00 – 55.00 |
| Chromium | 17.00 – 21.00 |
| Columbium (plus Tantalum) | 4.75 – 5.50 |
| Molybdenum | 2.80 – 3.30 |
| Titanium | 0.65 – 1.15 |
| Aluminum | 0.20 – 0.80 |
| Cobalt | 1.00 Max. |
| Carbon | 0.08 Max. |
| Manganese | 0.35 Max. |
| Silicon | 0.35 Max. |
| Phosphorus | 0.015 Max. |
| Sulfur | 0.015 Max. |
| Boron | 0.006 Max. |
| Copper | 0.30 Max. |
| Iron | Balance |

The 304 stainless steel has the following composition in weight percent:

| | |
|---|---|
| Carbon | 0.08% Max. |
| Manganese | 2.00% Max. |
| Phosphorus | 0.040% Max. |
| Sulfur | 0.030% Max. |
| Silicon | 1.00% Max. |
| Nickel | 8.00 – 11.00% |
| Chromium | 18.00 – 20.00% |
| Iron | Balance |

The 316 stainless steel has the following composition in weight percent:

| | |
|---|---|
| Carbon | 0.08% Max. |
| Manganese | 2.00% Max. |
| Phosphorus | 0.040% Max. |
| Sulfur | 0.030% Max. |
| Silicon | 1.00% Max. |
| Nickel | 10.00 – 14.00 |
| Chromium | 16.00 – 18.00 |
| Molybdenum | 2.00 – 3.00 |
| Iron | Balance |

The cobalt in these alloys and the cobalt and tantalum in the 718 are restricted for use within a reactor vessel. The cobalt and/or tantalum limit is a function of the neutron flux at the location of the material, surface area exposed to primary coolant, velocity of coolant passed the exposed area, and the residence time of the material within the reactor vessel. The 718 is not weld compatible with either stainless steel.

The multiple core-component assembly modules according to this invention serve two principal purposes.

1. The coolant flow is mixed within the chimneys so that the temperature of the coolants delivered to the outlet plenum from different chimneys is not so sharply different as immediately above the core outlet and the use of a stainless steel for the other components of the upper internals is feasible.

2. Stress due to local hot and cold streams is reduced. In summary the multiple-assembly modules:

1. Isolate the supporting structure, i.e., the columns and their associated structure, from sharp temperature gradients between adjacent core-component assemblies.

2. Mix effluent flow to reduce radial temperature gradients on the upper internals support structure, for example, avoid the washing of the columns and related parts by effluent differing sharply in temperature.

3. Prevent high-cycle thermal fatigue by isolating individual assembly effluent streams from the upper internals support structure.

4. Reduce the severity of thermal transients on upper internals structure, particularly during scram when the temperature may drop as much as 25° to 50° F per second, by use of chimneys and thermal sleeves to isolate the structure from the coolant emitted directly at the outlet of the core.

Even with the chimneys, localized temperature variations occur. Sodium streams, exiting from the chimneys at significantly different temperatures, mix in the outlet plenum imposing fluctuating temperatures on the surface material of the upper internals. During the scram transient, the section of the upper internals immersed in the sodium or other liquid pool is subjected to a very rapid drop in surface temperature because the control rods are fully inserted in the core. Jet impingement forces from the core outlet flow, and upper plenum cross flow forces are both unsteady, and tend to produce flow induced vibration of the upper internals structure. It has been found that this structure must have adequate structural stiffness. In providing the required stiffness the problem is confronted that only structural configurations which will perform satisfactorily in an ill defined thermal environment can be used.

The main load-bearing structure for the assembly including the outlet modules and their chimneys is a welded sandwich plate assembly. This assembly includes a plurality of pairs of plates, typically of 316 stainless steel. The shear web for each pair of plates is made by welded stub tubes which surround each of the outlet module chimney penetrations. The shear web so made is not continuous, but the unsupported span between shear webs is sufficiently short that the secondary bending moments induced in the top and bottom plates of each pair are small. The sandwich plate assembly including the grids and the chimneys is supported from the columns which are secured to the head plate at the top and are keyed to the core barrel at the bottom. The chimneys may be mechanically secured to the associated stubs as disclosed in the Ference application. The stub tubes can also be a loose fit about the chimneys and serve as thermal liners for the chimneys. In addition shear webs may be secured between each pair of sandwich plates.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIGS. 1A and 1B together are a view in longitudinal section (or a view in elevation with the vessel open) of a nuclear reactor in accordance with this invention;

FIG. 4 is a view in side elevation showing a fuel assembly;

FIG. 10 is a view in side elevation as seen from direction X—X of FIG. 13 of an outlet module in the reactor shown in FIGS. 1A and 1B;

FIGS. 12A and 12B together are a plan view in longitudinal section taken along line XII—XII of FIG. 13;

Figure 1A:
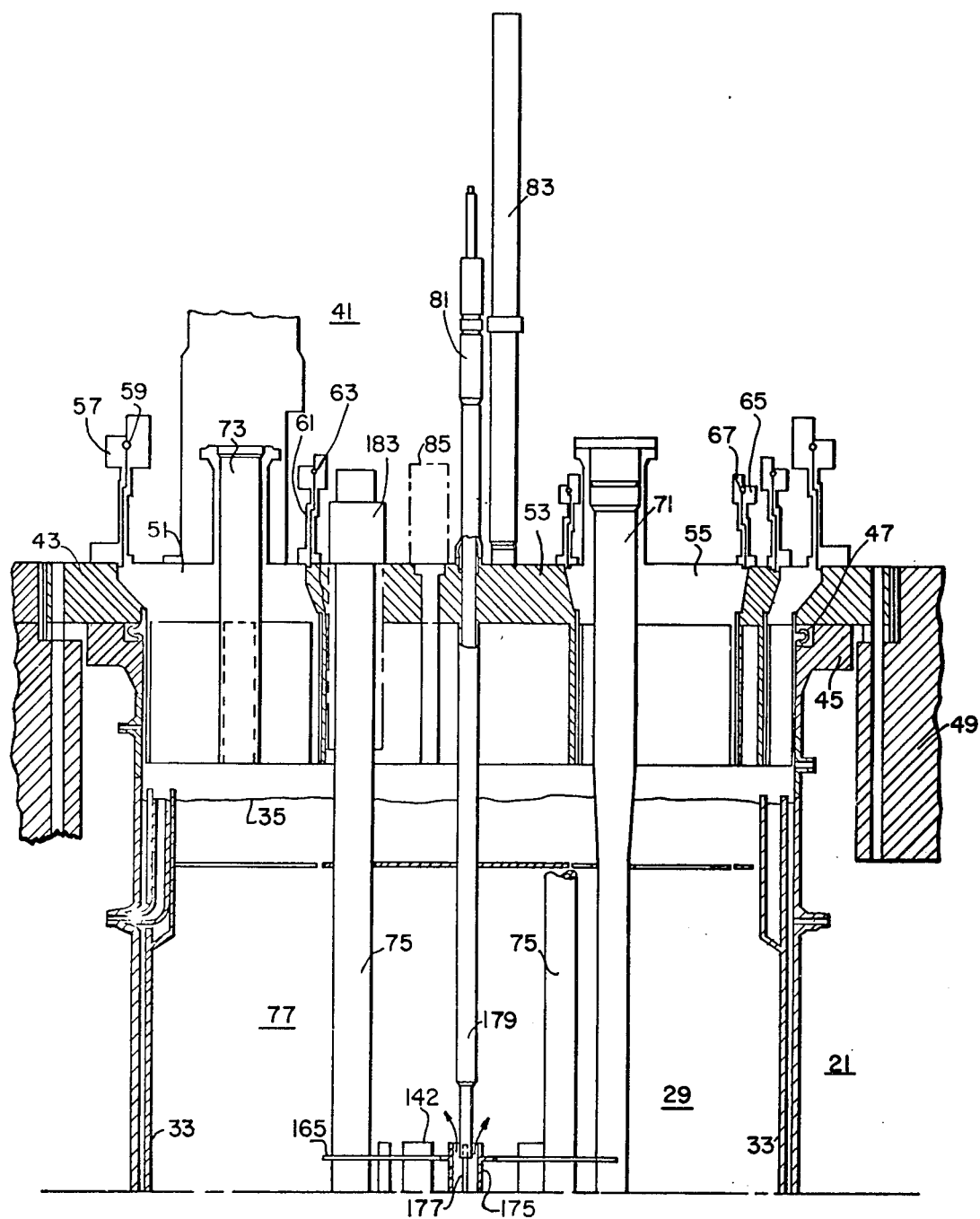

The reactor shown in the drawings includes a generally cylindrical pressure vessel 21 (FIGS. 1A and B) closed at the bottom by a bell 23 which bounds an inlet plenum 25. The vessel 21 has a plurality of inlet nozzles 27 above the bell 23 through which a heat-transfer or cooling fluid or effluent such as liquid sodium is supplied to the plenum 25 under pressure. The vessel 21 has an outlet plenum 29 from which the hot fluid is derived through a plurality of outlet nozzles 31. The vessel is provided with a thermal liner 33 encircling the outlet plenum 29 and the regions above and below the outlet plenum. The permissible upper level and the minimum safe lower level of the fluid are indicated in FIGS. 1A and 1B by wavy lines 35 and 37 respectively. Above the surface (35) of the fluid there is an inert gas such as argon at low positive differential gauge pressure above atmospheric pressure (about 2 or 3 inches of water).

At the top the vessel 21 is closed by a head 41. The head 41 has a stationary outer ring 43 which is bolted (bolts not shown) to a flange 45 of the vessel 21. The joint of the ring 43 and flange 45 is sealed internally by an omega seal 47. The vessel 21 is supported on a support ledge 49 of a concrete containment. The ring 43 is bolted to the ledge 49. The head 41 has a plurality of rotating plugs 51, 53, 55 which are sealed to prevent leakage of the reactor cover gas to the containment building atmosphere. Plug 51, of largest diameter, is coaxial with the vessel. The stationary ring 43 supports the plug 51 through an annular riser 57 and a bearing 59 (FIG. 1). Plug 53, of intermediate diameter, and plug 55, of smallest diameter are eccentric to the axis of the vessel 21. Plug 51 supports plug 53 through an annular riser 61 and a bearing 63 and plug 53 supports plug 55 through an annular riser 65 and a bearing 67. The risers 57, 61 and 65 are cylindrical extensions above the periphery of the stationary ring 43, the plug 51 and the plug 53. The risers 57, 61, 65 serve to mount the bearings 59, 63, 67, pressure seals (not shown) for the plugs and part of the gearing (not shown) for driving the plugs. The rotating plugs 51, 53, 55 position the fuel and control handling equipment over all core assembly locations.

Figure 2:
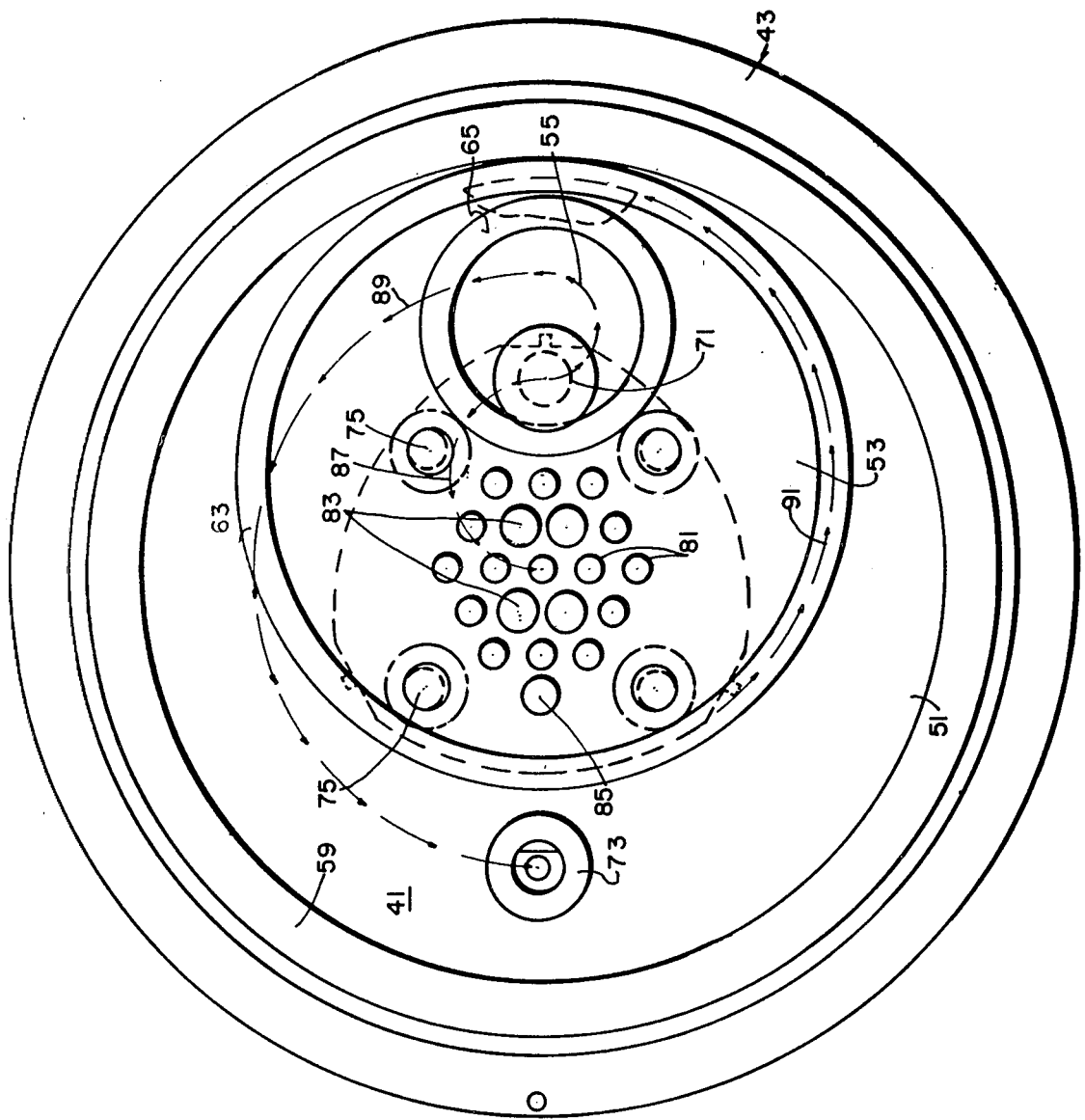
FIG. 2 is a plan view of the top of the reactor shown in FIG. 1.

The plug 55 contains an in-vessel transfer machine port 71 set eccentrically. The plug 51 contains the ex-vessel transfer machine port 73 set eccentrically. The plug 53 supports columns 75 which support the upper internals 77, the primary control rod assembly drive mechanisms 81, the auxiliary control-rod drive mechanisms 83, and one or more sealed surveillance ports 85. By rotating the plugs 51, 53, 55, the in-vessel transfer machine port 71 can be positioned over the various components within the vessel a typical transfer machine "path" being shown by the arrows 87 (FIG. 2) and over the ex-vessel transfer machine port 73 as shown by the arrows 89. During the rotation of plug 53, the column 75, the control-assembly drives 81 and 83 and the port 85 are rotated as shown by the arrows 91. When the plugs 51, 53, 55 are to be rotated, the upper internals 77 are raised and the drives 81 and 83 are disconnected from the driven parts. Jacks (not shown) are provided for raising the upper internals. Typically, the in-vessel transfer machine port 71 is positioned over the fuel transfer ports after the plugs 51, 53, 55 are each rotated through angles less than 180°.

Figure 3:
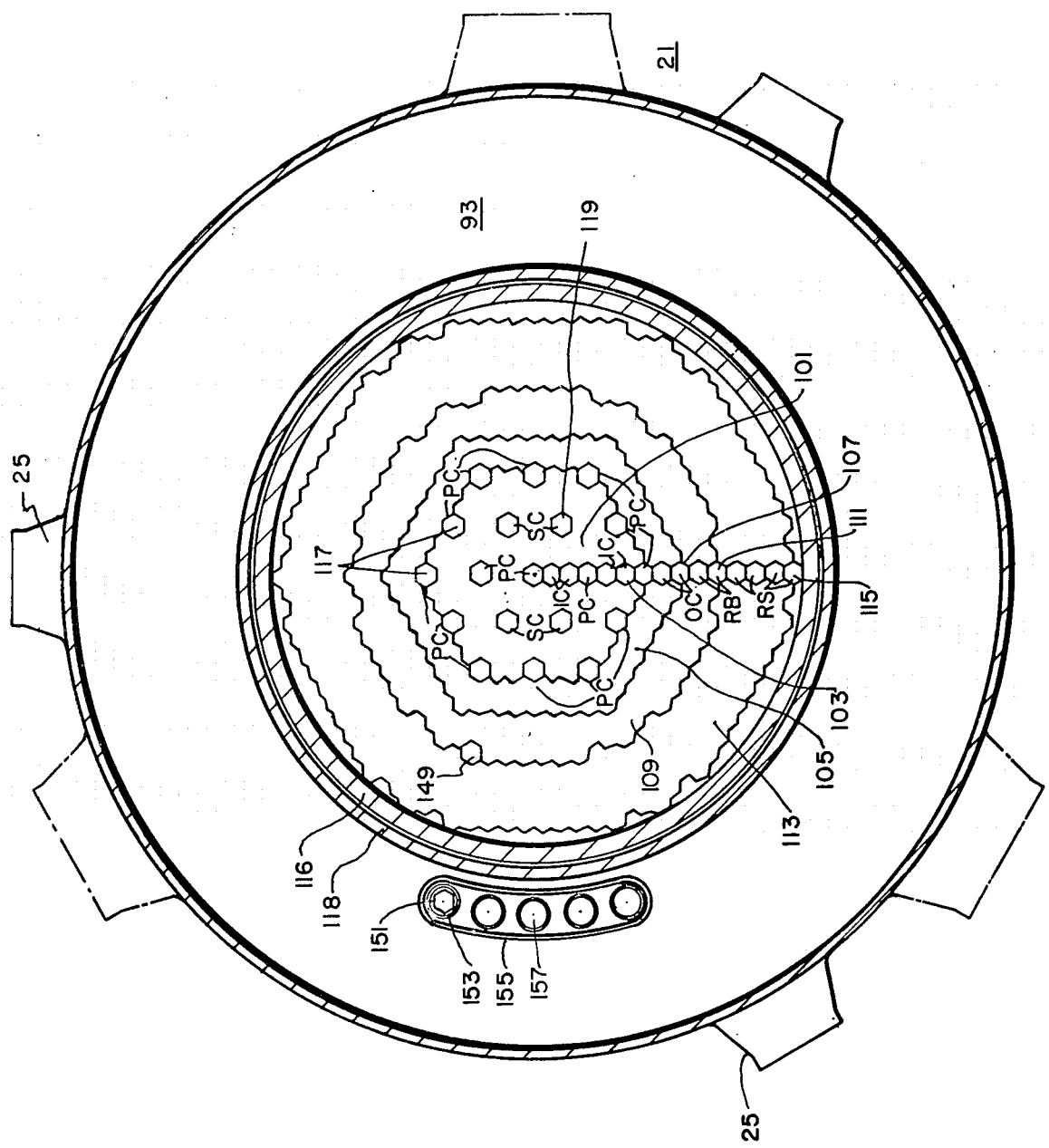
FIG. 3 is a view in transverse section taken along line III—III of FIG. 1 showing the core components.
Figure 19:
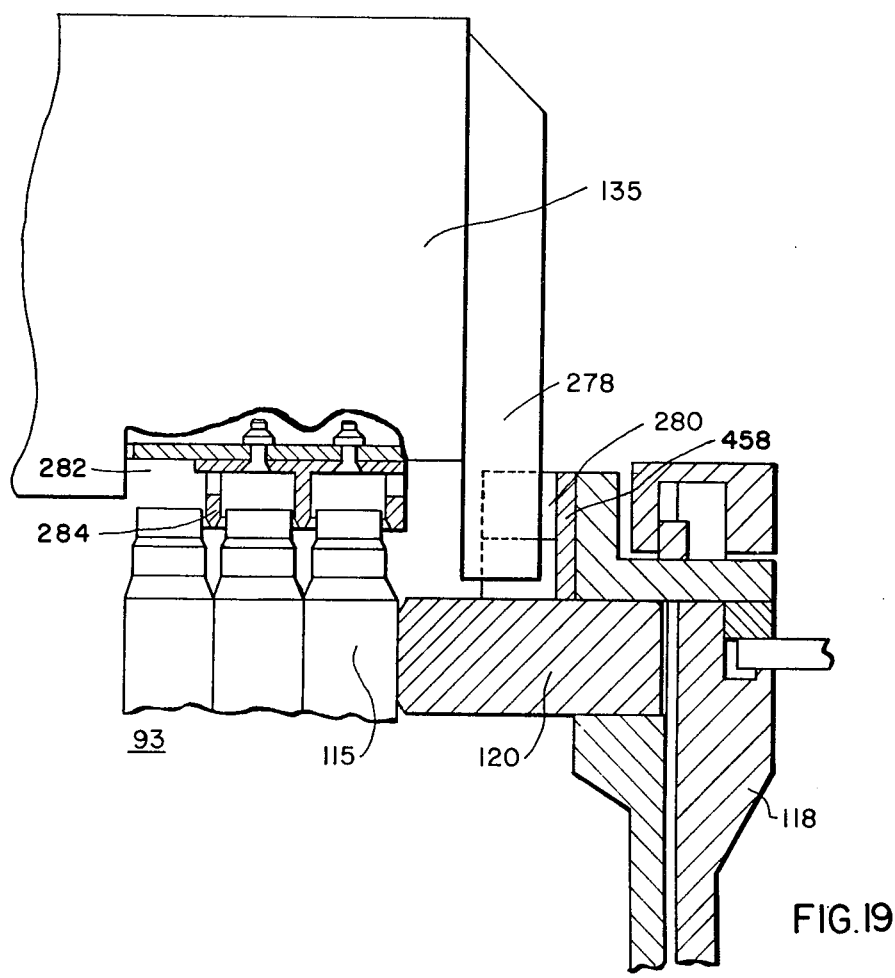
FIG. 19 is a view in section taken along lines XIX—XIX of FIG. 18.
Figure 18:
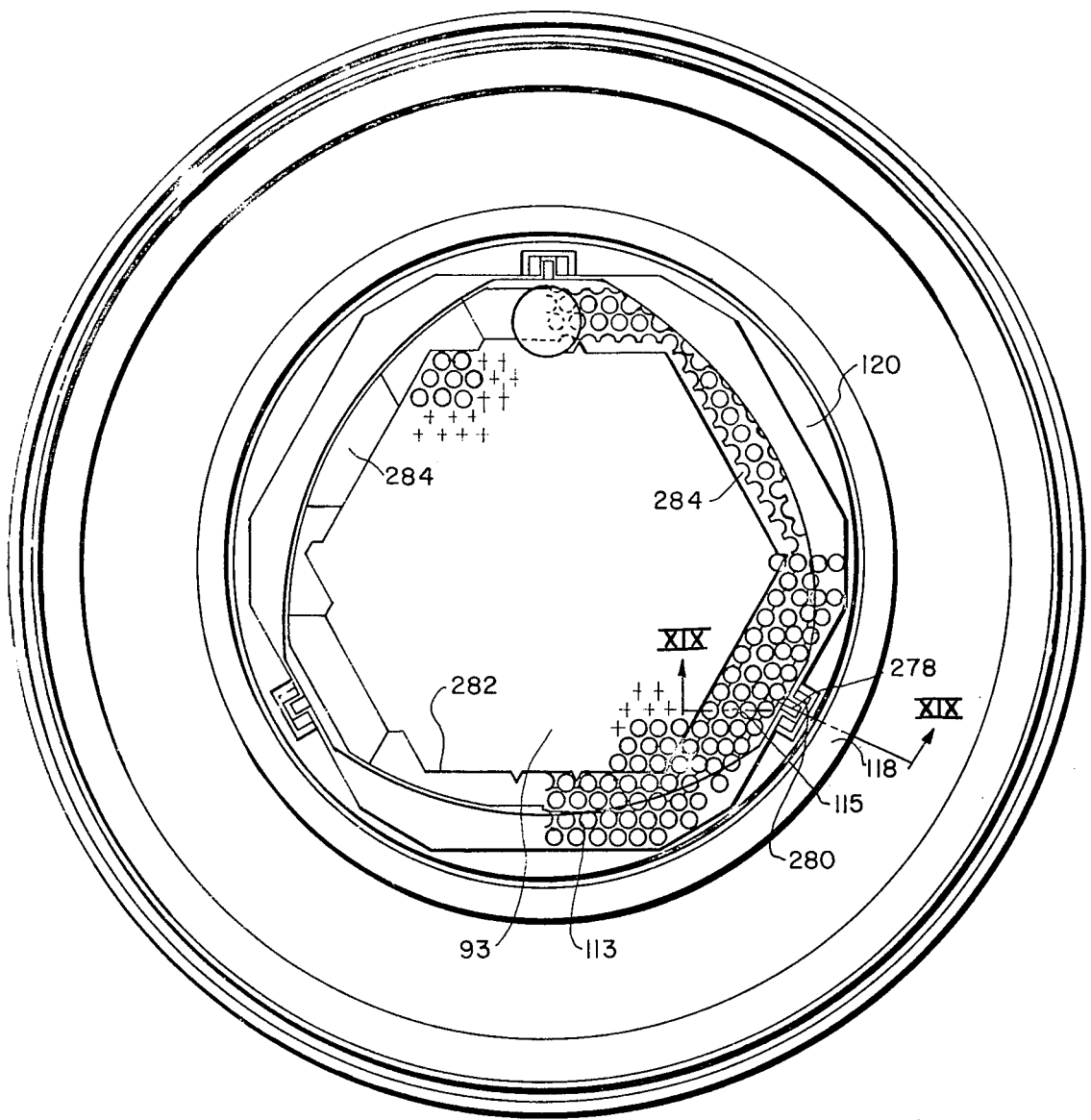
FIG. 18 is a plan view of the portion of reactor shown in FIGS. 1A and 1B just above the core showing the peripheral seal.
Figures 20, 21:
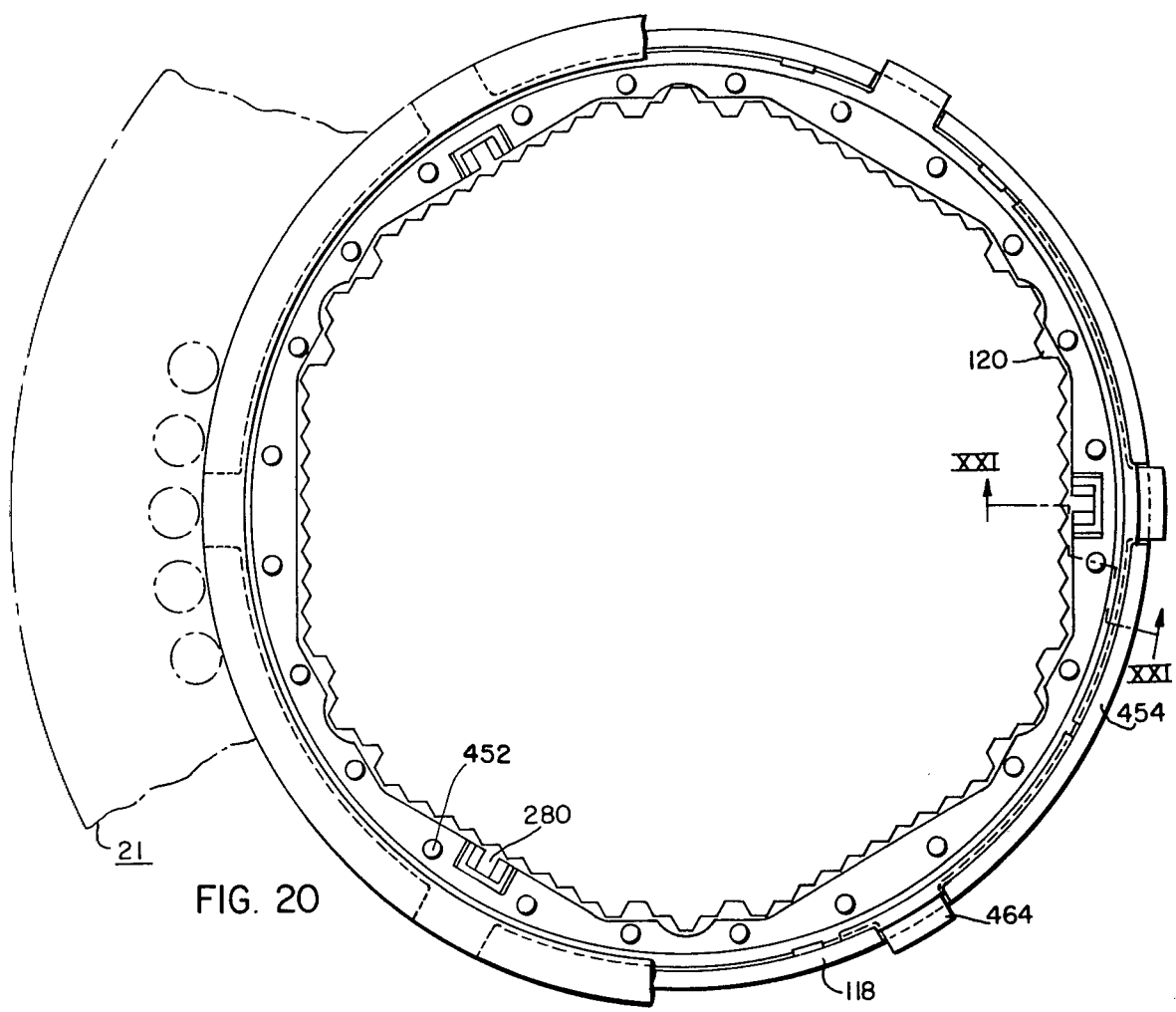
FIG. 20 is a plan view of the core barrel, core former rings and the keyways for the keys connecting the upper internals to the core barrel.
FIG. 21 is a view in section taken along line XXI—XXI of FIG. 20.

Within the vessel 21 there are, in addition to the upper internals 77, the core 93 and the lower internals 95. The core includes an inner zone 101 (FIG. 3) of fuel assemblies 103 (typically 108 in number) of lower enrichment (typically 18.7%, labeled IC) and an outer zone 105 of fuel assemblies 107 (typically 90) of higher enrichment (typically 27.1%, labeled OC). Around the zone 105 there is a radial blanket 109 of radial blanket assemblies 111 (typically 150, labeled RB). Around the zone 109 there is a zone 113 of removable radial shielding assemblies 115 labeled RS. About the removable shield 115 there is a fixed shield 116. The fixed shield is enclosed by a core barrel 118. Core restraint former rings 120 (FIGS. 1B, 20, 21) are provided spaced along the perimeter of the radial shield for restraining deformation of the core. The former rings 120 are formed in sections of arcs and are secured together by pins 452 (FIG. 21) between rings 454 and 456. Keyways 280 are secured to spacers 458 (FIG. 19) welded to the upper rings 454. The keyways 280 are in the form of slots into which the keys 278 slide. Since there are three keys and keyway pairs the upper internals 77 can only be moved vertically. A thermal shield 460 is provided over the upper end of the core barrel. This shield 460 holds in place shear rings 462, in slots on the core barrel. The shear rings 462 prevent the assembly 456, 120, 454 from moving vertically. The rings 454 keys 464 which engage slots (not shown) in the core barrel.

The inner zone 101 includes, in addition to the fuel assemblies, primary control-rod assemblies 117 (typically 15 in number, labeled PC) and secondary control-rod assemblies 119 (typically 4 in number, labeled SC). The control-rod assembly drives 81 and 83 can be set so that the control-rod assemblies 117 are either completely removed or positioned at any axial position within the core 93. The lower and higher enrichments in the zones 101 and 105 promote more uniform power generation across the core 93. Typically each fuel-rod assembly contains 217 fuel rods.

Figure 5A:
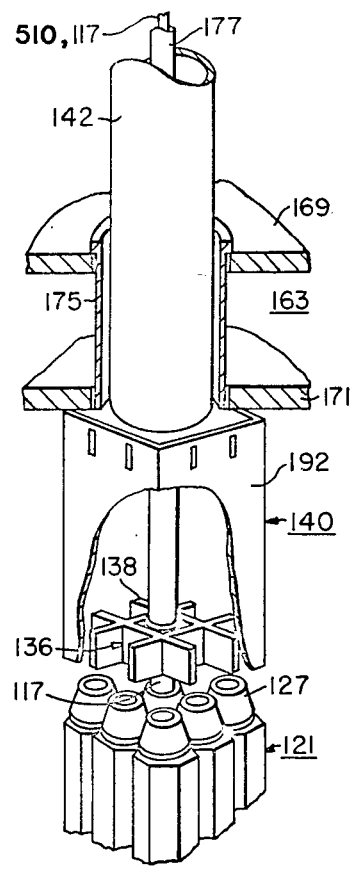
FIG. 5A is a fragmental diagrammatic view in perspective showing an outlet module of the nuclear reactor shown in FIGS. 1A and 1B.
Figure 5:
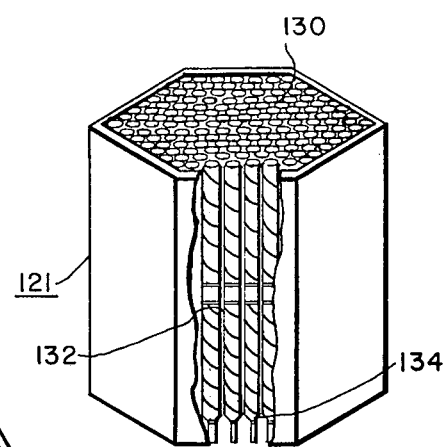
FIG. 5 is a fragmental view in perspective showing a cut-out section of the fuel assembly shown in FIG. 4.

The fuel rod bundle or assembly 130 (FIGS. 4 and 5) is contained within a thin-walled hexagonal duct 121 which serves to guide the heat-transfer fluid through the assembly and to protect the bundle during handling. The fuel ducts have a plenum region 122 above the fuel and axial fertile blanket sections for containing gaseous fission products. There is a core restraint load pad 124 intermediate the ends of the duct 121. The fuel rods 132 in bundle or assembly 130 are wrapped in wires 134 and are thus spaced by the wires. A rod attachment facility (not shown) is provided in the lower part of the duct 121 to provide for uniform flow distribution and axial restraint of the rods. The attachment subassembly rails mate with a keyhole slot in the bottom end-cap each of fuel rod in a discriminatory manner to prevent mixing of different enrichments. The duct 121 has an inlet nozzle 125 and an outlet nozzle 127. The inlet nozzle has lateral openings 129 through which fluid is admitted to the duct 121. Below this opening there is a circumferential slot 131 for a piston ring which seals the region below the opening 129 against fluid flow when the assembly is inserted in a socket. The duct may contain orifice plates (not shown) for controlling the flow of the fluid. At the end of inlet nozzle 125, there is discrimination post 133 which assures that the fuel assembly type 103 or 107 cannot be inserted in a control-assembly position. Each outlet nozzle 127 directs fluid flow through an aligned opening 136 (FIGS. 5A, 5B) in a holddown grid 138 of an associated outlet module 140 and thence through a chimney 142 to the outlet plenum 29. The grid 138, outlet module 140 and chimney constitute part of the upper internals 77.

The primary function of the radial-blanket assemblies 111 is to convert fertile material (typically depleted U-238) into fissile material (typically Pu) by neutron capture. A secondary function of assemblies 111 is to absorb and reflect neutrons from the fuel assemblies 103 and 107, thus to shield the structures outside of the blanket. The radial blanket assemblies 111 also generate energy. An operational feature of the radial blanket 109 is the facility for shuffling of the assemblies 111 from positions adjacent zone 105 to peripheral positions. Fresh fertile assemblies in the inner rows of the radial blanket 109 generate little energy because of the absence of fissionable material. As the fissionable material increases the generated energy increases. By moving the assemblies 111 to outer rows of blanket 109, the raising of the cladding to excessive temperatures beyond design limits is avoided. Shuffling of radial assemblies equalizes the energy generated in the radial blanket 109 and reduces radial temperature gradients. Typically shuffling of the assemblies 111 is performed annually during refueling. The control-rod assemblies 117 and 119, the blanket assemblies 111 and radial-shielding assemblies 115 have ducts 137, 139, 141 of the same contour as the ducts 121 with core restraint load pads 500, 501, 502 and inlet nozzles 143, 145 and 147 as described above (FIGS. 1B and 3).

The core 93 includes a surveillance specimen 149 (FIGS. 1B and 3) adjacent the blanket 109 and another specimen 151 adjacent the barrel 118. The surveillance specimen 151 is encircled by flow guides 153 and 155. There are also fuel-transfer and storage containers 157 adjacent the barrel 118 and also encircled by flow guide 155.

The upper internals 77 function to:
1. Provide a backup mechanical holddown for the core 93 in the event of a malfunction of the core hydraulic holddown system.
2. Position, protect, guide and support the core instrumentation.
3. Assure alignment of the control-assembly system under steady state and seismic conditions and protect the control-assembly drive line 179 from flow induced vibration.
4. Control flow in the vessel outlet plenum 29 to minimize flow stratification during a scram transient.

The unique features of the upper internals 77 apparatus according to this invention are the outlet module assembly.

Figure 6:
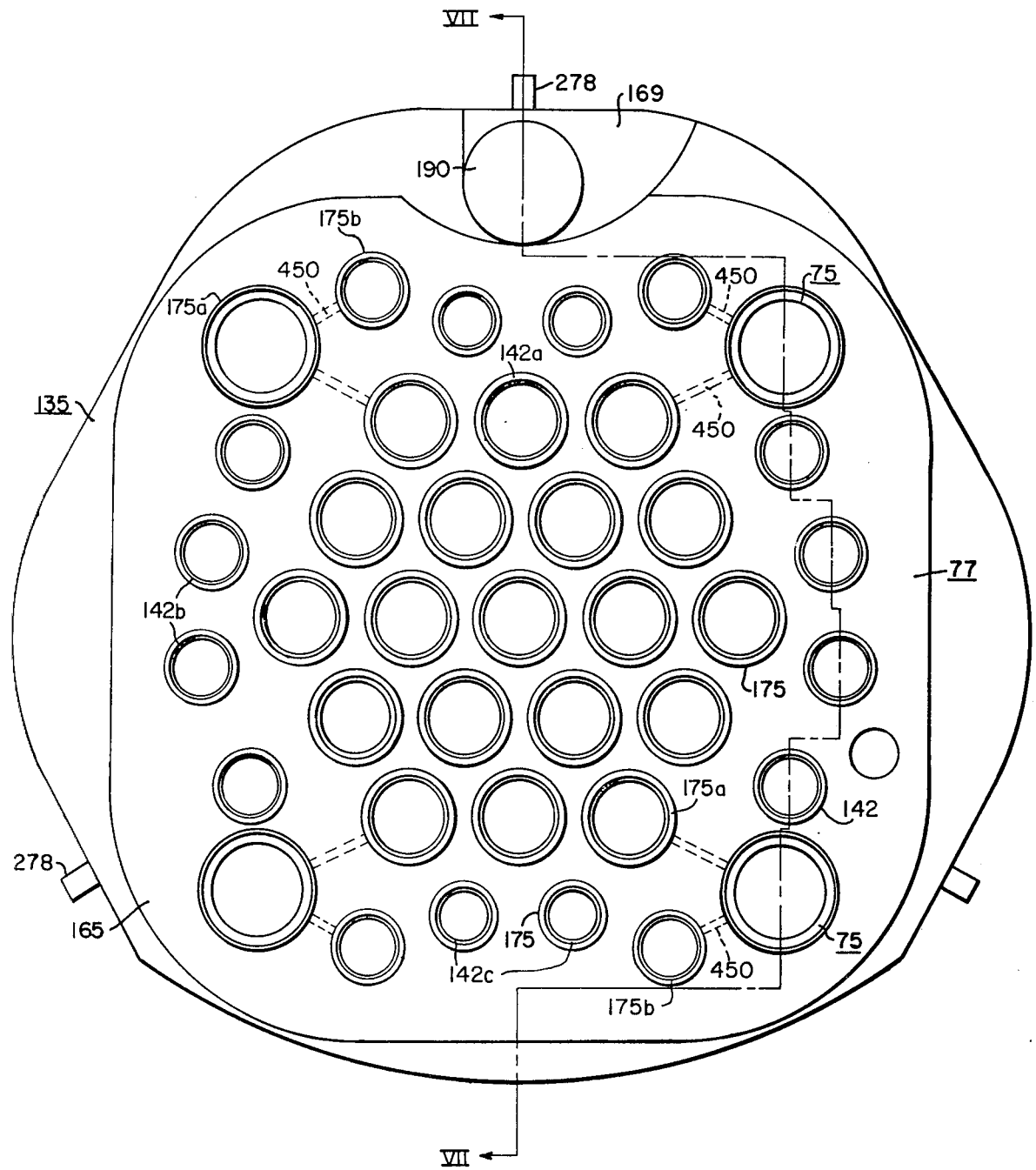
FIG. 6 is a plan view of the upper internals of the reactor shown in FIGS. 1A and 1B including the chimneys, the columns and the stub tubes.
Figure 7:
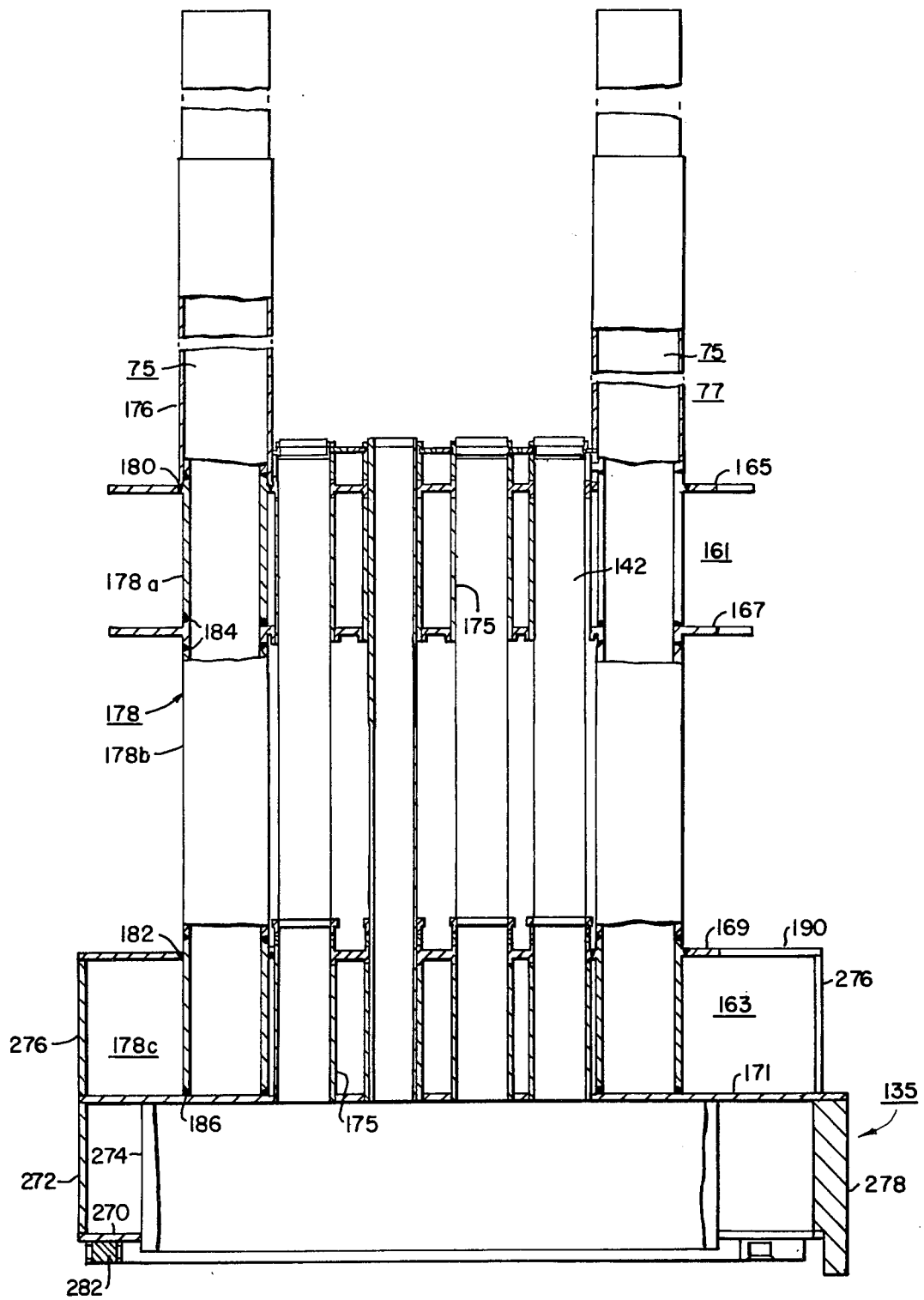
FIG. 7 is a view in section taken along lines VII—VII of FIG. 6.
Figure 8:
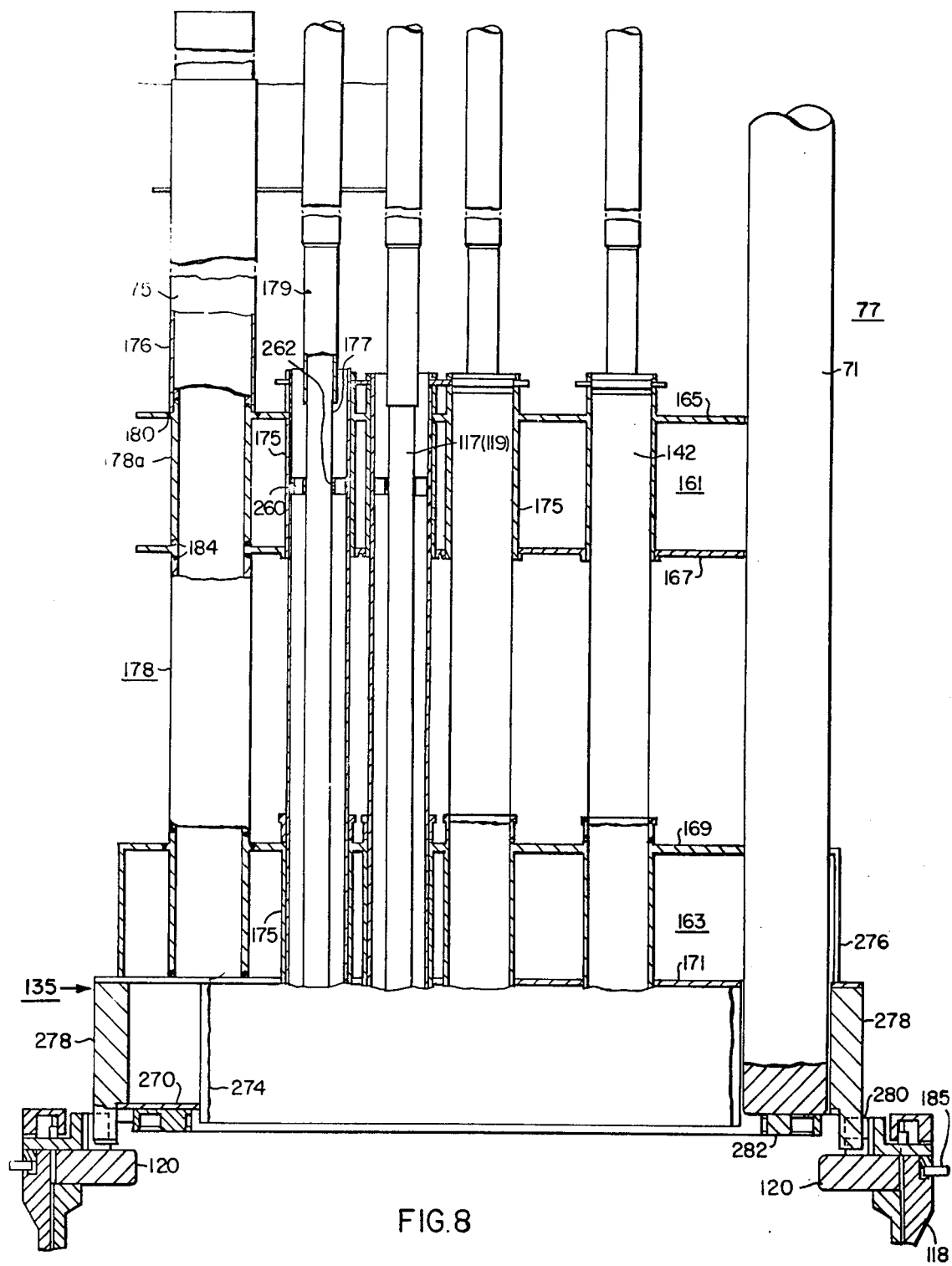
FIG. 8 is a view predominately in side elevation but partly in section showing the upper internals of the reactor shown in FIGS. 1A and 1B.
Figure 12A:
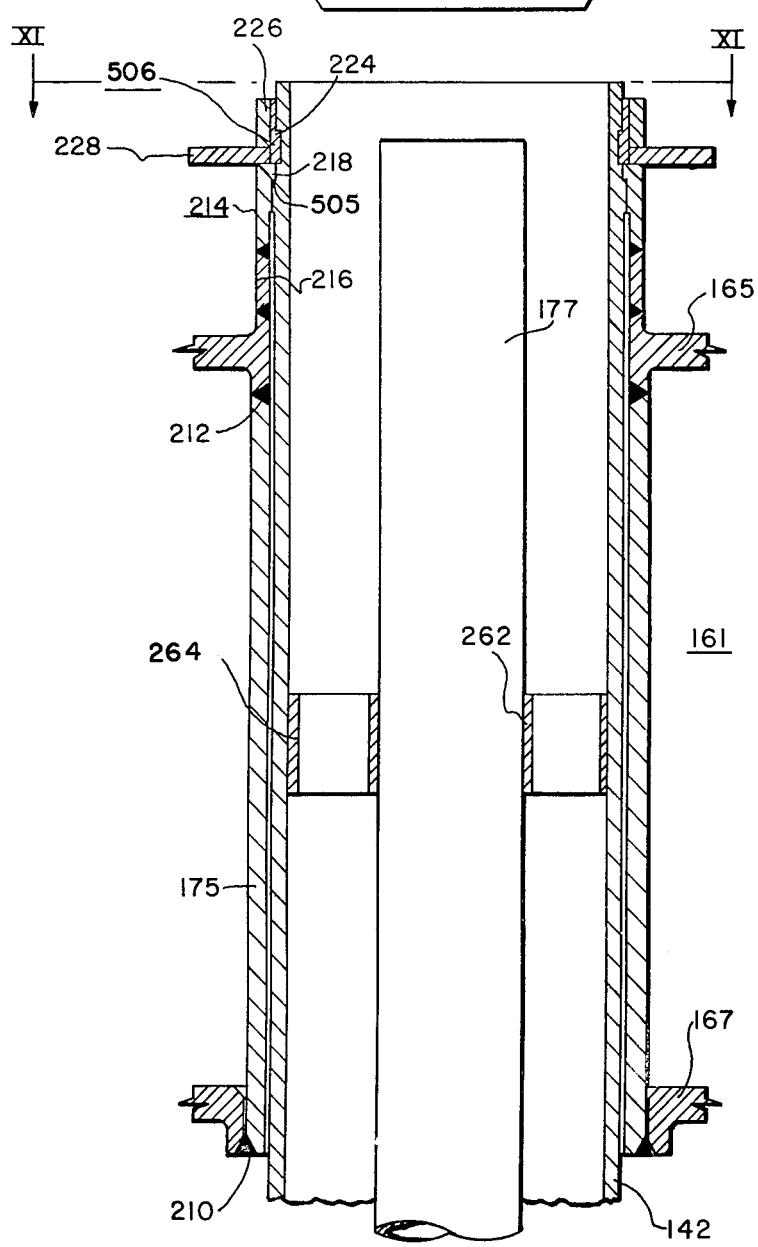
Figure 13:
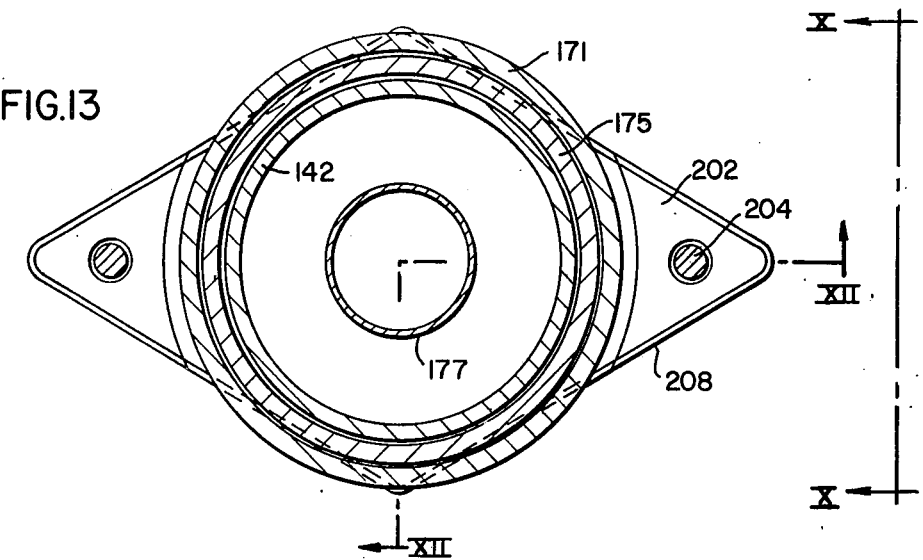
FIGS. 13, 14, 15, 16 and 17 are views in transverse section taken along lines XIII—XIII, XIV—XIV, XV—XV, XVI—XVI and XVII—XVII respectively of Figs. 12A and 12B.
Figure 14:
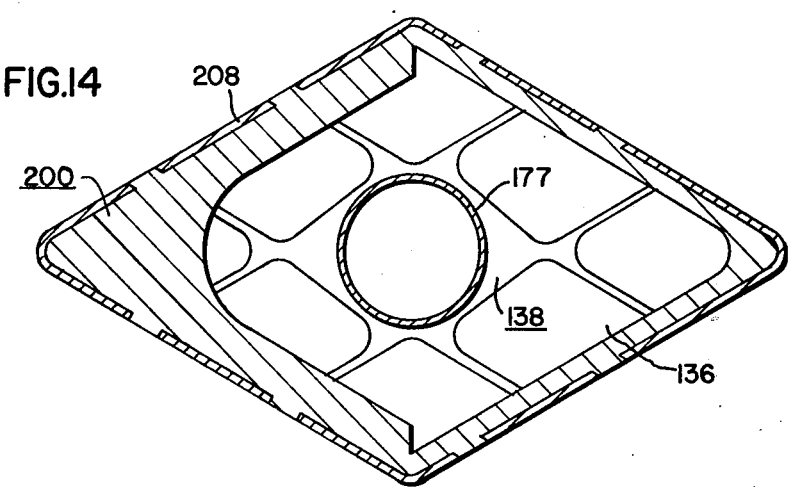
Figure 15:
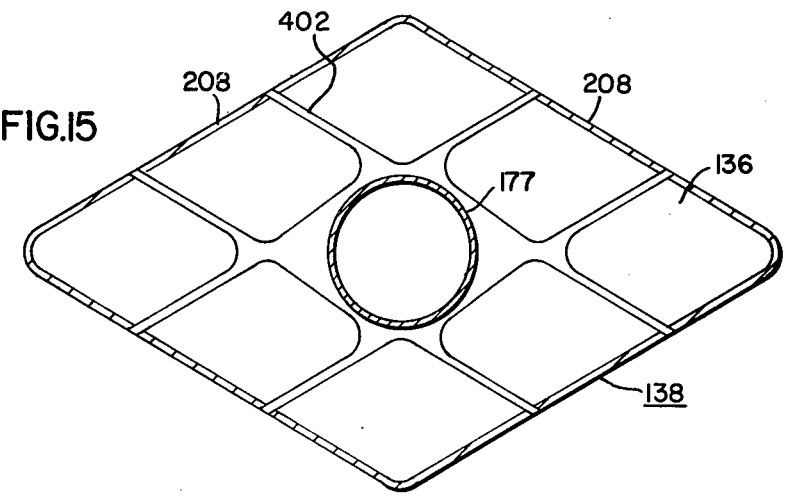
Figure 17:
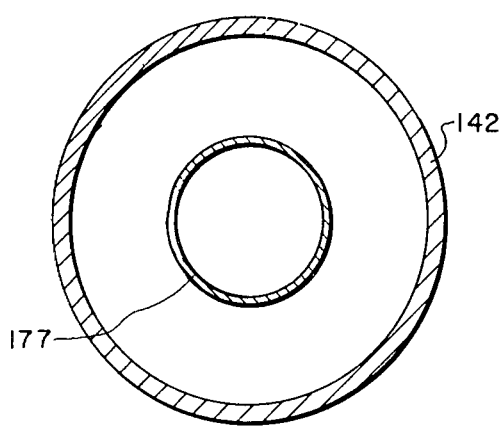
Figure 16:
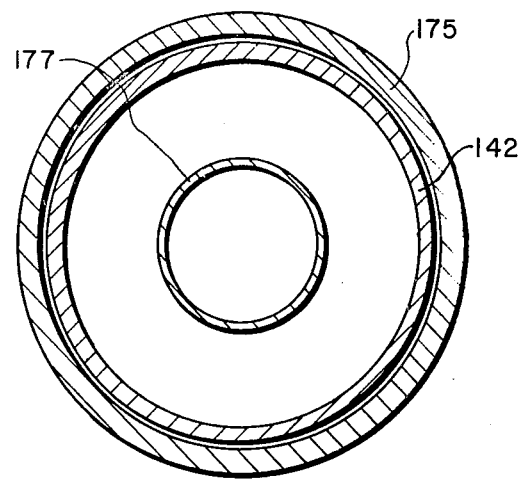

The main body of the load-bearing structure of the upper internals 77 is a weldment (FIGS. 7, 8) of stainless steel (316). This weldment includes the columns 75 and a plurality of pairs 161 and 163 of plates, which may be described as sandwich plates, and which include the plates 165, 167, 169, 171. Stub tubes 175 are welded to the plates 165 and 167 and 169 and 171 of each pair 161 and 163 by circumferential welds 210 and circumferential butt welds 212 (FIG. 12). These stub tubes 175 serve as shear webs for the pairs of plates 161 and 163. The columns 75 are also welded to the plates 165 and 171. In addition there are ribs 450 (FIG. 6) between each column 75 and its adjacent stub tubes 175a and 175b. The ribs 450 are welded to the column 75, the sandwich plates 165 and 167 and 169 and 171 and to the stub tubes. Above the upper plate 165 each column 75 is provided with a liner or sleeve 176 which is welded to an inner shell 178. The inner shell 178 is in abutting sections 178a, 178b, 178c welded around their abutting peripheries. Sections 178a and 178c are forgings while sections 178 and 178b are pipes. The forgings have small radial projections facilitating the welding. The upper section 178a and the lowermost section 178c are welded to the upper plate 165 of pair 161 and to plate 169 of pair 163 by peripheral lateral welds 180 and 182. The plate 167 of the pair 161 is welded to the intermediate section 178b and to the upper section 178a by butt welds 184 and the lower plate 171 is welded to the lower section 178c by a butt weld 186. The plate 169 includes a penetration 190 (FIGS. 7 and 8) for the in-vessel transfer mechanism 71. The column 75, including the sleeves 176 and the shell 178, the plates 165, 167 169 and 171 and the stubs 175 are composed of stainless steel (typically 316).

Figure 5B:
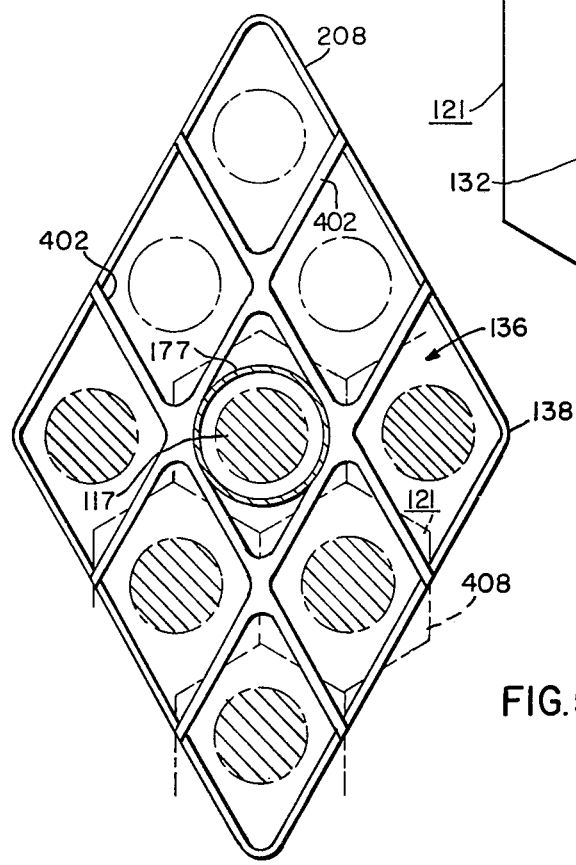
FIG. 5B is a diagrammatic view of the support or holddown grid of the outlet module shown in FIG. 5A with core assemblies (dotted) in perspective.

The upper internals 77 includes a plurality of outlet modules 140 (FIGS. 5A, 5B, 10–18). These modules 140 are composed throughout of highly refractory nickel-chromium-iron alloy and are joined mechanically to the weldment 75-161-163-175. Each module 140 includes the grid 138, the flow collector 192, and the chimney 142. Each module 140 serves to direct the coolant streams from a plurality of core-component assemblies 103, 107, 117 and 119 into its associated chimney 142 and to confine this path. Each grid 138 has the general appearance of an egg crate (FIG. 5B). The grid 138 is of relatively light structure. The outer shell 208 of the grid has a thickness of about 3/16 inch, the boundaries 402 of the grid openings 136 each has a thickness of about ⅛ inch. The outer shell 208 of the grid 138 by flexing takes up the strain produced on the sides 402 by the stresses of thermal expansion and compression. The walls 406 (FIG. 12B) defining the grid openings have a depth of 4 to 6 inches. These walls form rhombuses about 4.76 inches on a side 402-(208). The ducts 121 of the core-component assemblies are disposed with their nozzles 127 centered in the grid openings (FIG. 5B). The effluent from the nozzles 127 impinges on the walls 406 tangentially rather than at right angles. The distance between the hexagonal sides 408 of the ducts 121 is greater than the smaller diagonal of each opening 136. The grid 138 would then prevent a core-component assembly from being ejected upwardly from the core 93.

Figure 9:
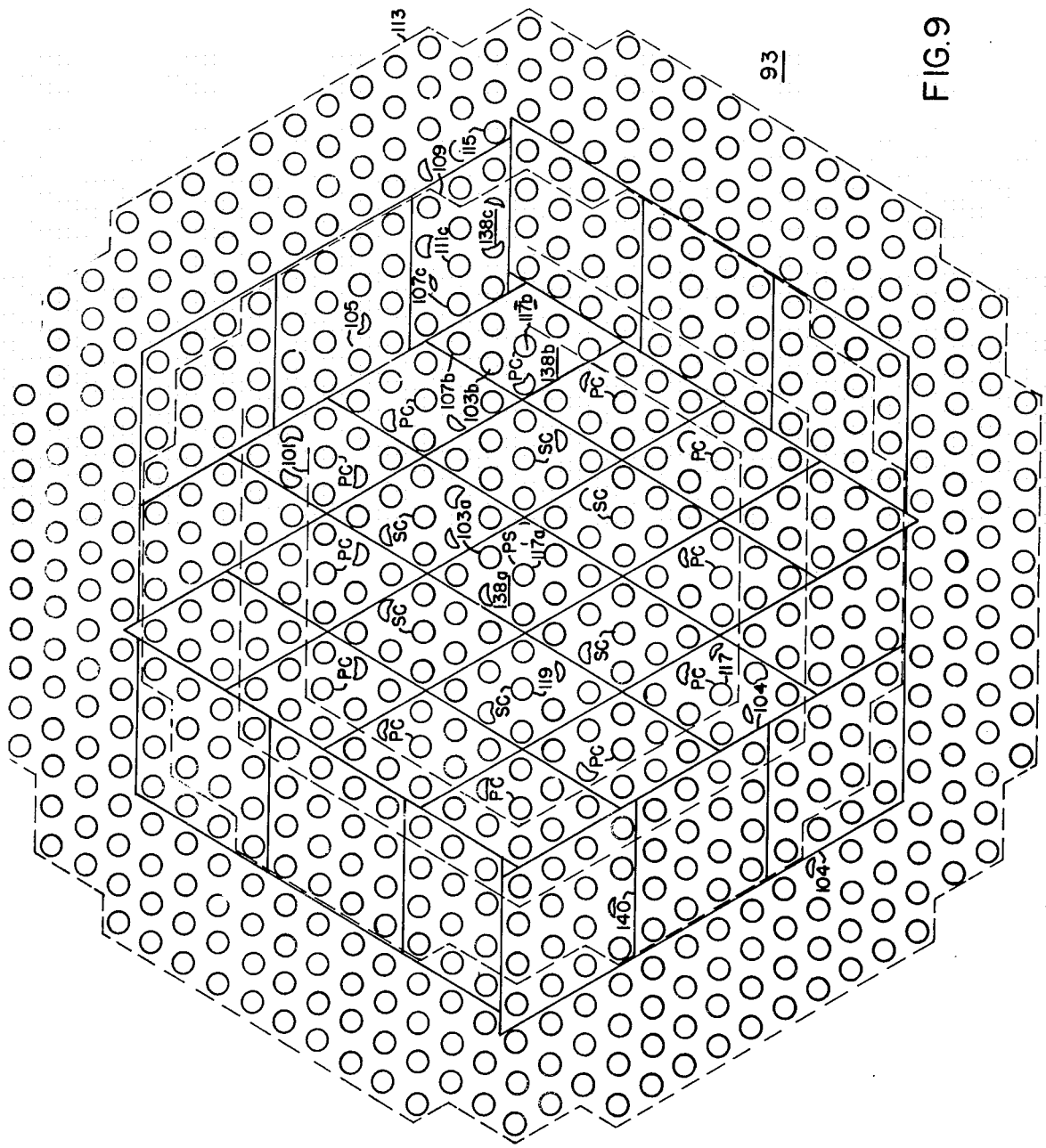
FIG. 9 is a diagrammatic plan view showing the relationship between the outlet modules and the core component assemblies of the reactor shown in FIGS. 1A and 1B.
Figure 9A:
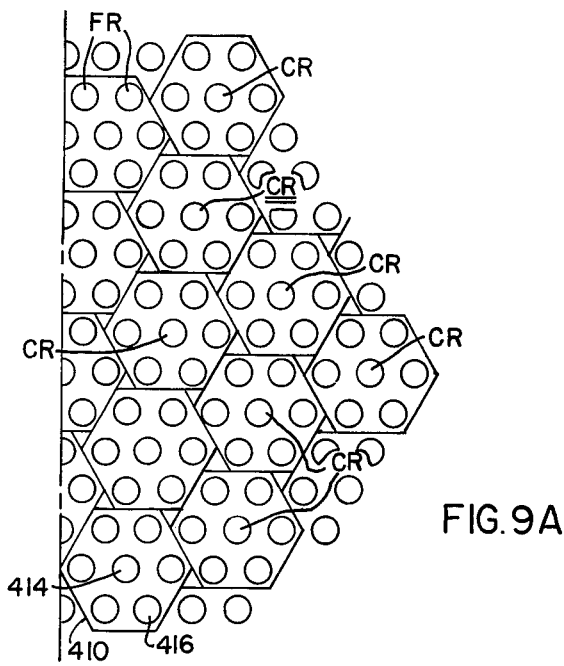
FIG. 9A is a fragmental diagrammatic view, similar to FIG. 9, but showing the relationship of the outlet modules in accordance with a modification of this invention, which allows the control rods of an alternate pattern to remain concentric with the outlet module.
Figure 9B:
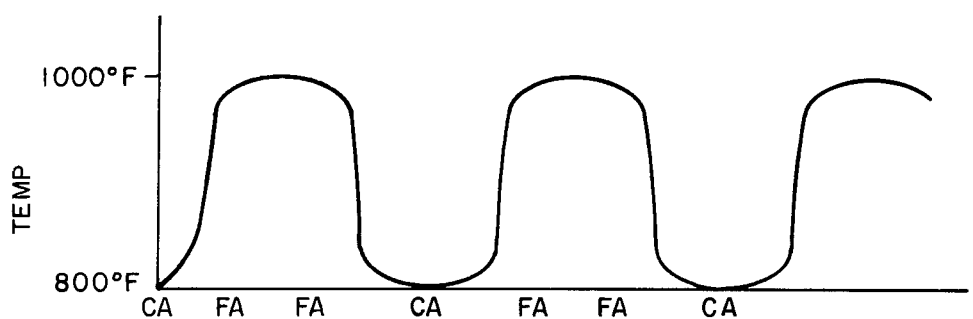
FIG. 9B is a graph showing the temperature distribution of the coolant injected into an outlet module at the outlet of the core.

FIG. 9B shows the temperature distribution at the grid 138 of a module 140 of the type shown in FIG. 9. Temperature is plotted vertically and the disposition of the assemblies is plotted horizontally, CA indicating control assembly and FA fuel assembly. It is seen that the temperature of the coolant emitted by the control assemblies is about 800° F and the temperature of the coolant emitted by the fuel assemblies is 1000° F. The modules 140 mix this fluid and inject it into the outlet plenum at a more uniform temperature.

Figure 9C:
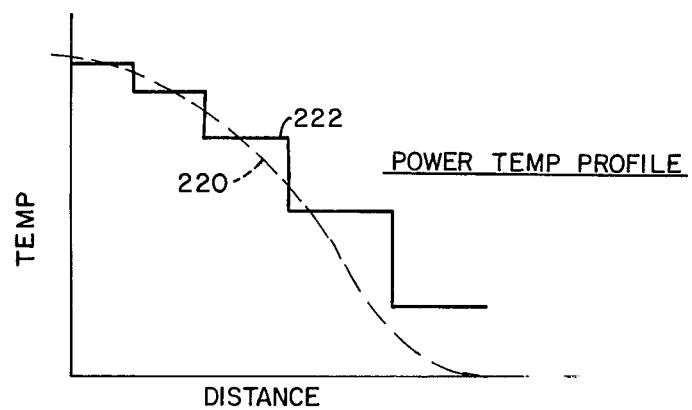
FIG. 9C is a graph showing the relationship between the temperature distribution along the core and at the outlet of chimneys in the practice of this invention.
Figure 11:
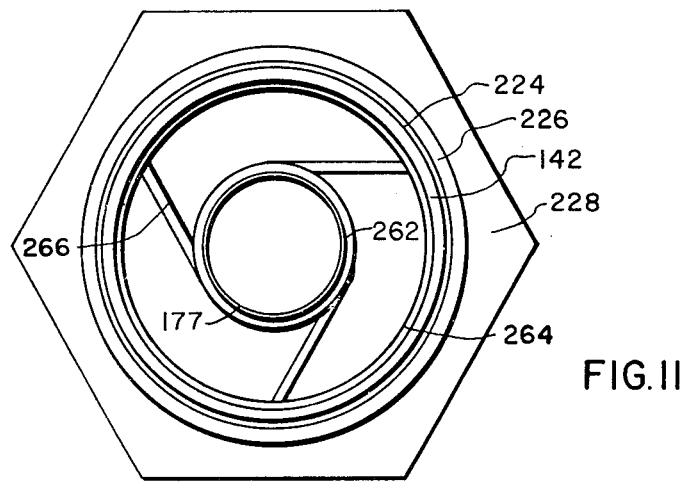
FIG. 11 is a plan view as seen from the direction XI—XI of FIG. 12A of this module.

In FIG. 9C temperature is plotted vertically and distance from the vertical center-line of the core horizontally. The broken-line curve 220 shows the temperature as a function of distance from the core center line at the core outlet and the full-line curve 222 at the outlet of the chimneys 142. It is seen that the modules stabilize the temperature.

FIG. 9 shows the disposition of the grids 138 over the core 93. The shells 140 bounding the grids 138 nest and the grids form a continuum over the modules whose emitted coolant is channeled. Typically there are twenty-one modules 140, each receiving the coolant from nine core-component assemblies, ten modules each receiving the coolant from sixteen assemblies, and four modules each receiving the coolant from twelve assemblies; thirty-five modules in all.

FIG. 9A shows an outlet module structure in which the modules 410 are hexagonal. FIG. 9 corresponds to assembly configuration in which the control assemblies are set on a 3 assembly triangular pitch, while FIG. 9A corresponds to an assembly configuration in which the control assemblies 414 are set on a 2½ assembly triangular pitch. This disposition of the control assemblies 414 is called the knight's move pattern as it resembles the moving pattern of the knight in chess.

In the FIG. 9A pattern each module channels cool emitted coolant from an assembly 414 in the center and hot emitted coolant from six peripheral fuel assemblies 416.

The outlet modules 140 (FIG. 9) and their chimneys are of different dimensions (FIG. 6) in proportion to the quantity of coolant flowing through them. The chimneys 142a for modules including control assemblies have the greatest diameter (about 10 inches inside diameter); the chimneys 142b for modules including 12 and 16 assemblies have intermediate diameters (about 7½ inches inside diameter) and the chimneys 142c for the remaining modules have the smallest diameter (6⅝ inches). The effluent from the radial shielding zone 113 is not channeled. It is emphasized that each grid 138 channels streams of widely different temperature into its associated chimney 142. Typically the central grid 138a channels relatively cool effluent from control assembly 117a and the relatively hot effluent from fuel assemblies 103a (FIG. 9). Another grid 138b channels relatively cool effluent from control assembly 117b, hot fluid from the lower-enriched fuel assembly 103b and still hotter fluid from the more highly enriched fuel assembly 107b. The other grids in the center are similar. In each case the grid 138 channels cool fluid in the center from one control assembly 117, and hot fluid around the periphery from eight fuel assemblies 103. peripheral grid 138c channels fluid from fuel assemblies 107c and cooler fluid from fertile assemblies 111c. The other peripheral grids 138 are similar. In each case hot fluid is channeled from one to four assemblies and cooler fluid from seven to twelve assemblies. The affluent through the shielding assemblies 115 is cool and requires no channeling.

The outlet modules 140 including the associated chimneys 142 are composed of highly refractory nickel-chromium-iron alloy (typically INCONEL-718). Each module 140 (FIGS. 10–18) includes in addition to the grid 138 a transistion member 200 (FIG. 12B) connected to the flow collector 192 to effect the transition between the diamond (or hexagonal) configuration of the grid and the circularly-cylindrical configuration of the chimney 142. The grid 138 and the transition member 200 are enclosed in the shell 208 (of INCONEL-718) which is secured to these members by welding. At the top the transistion member 200 has a shoulder 202 which extends along the lower plate 171. Rotation of the transition member 200 relative to the weldment 75-161-163-175 is prevented by a pin 204 which extends from plate 171 and engages member 200. The grid 138 and the transition member 200 also have projections 240 and 242 (FIG. 10) which engage the shell 208.

At the top the transition member 200 also has a lip 206 to which the chimney 142 is welded. The chimney 142 is encircled by, or housed in, the stub tubes 175 with which it is coaxial and which are composed of stainless steel. Since this alloy is not weld compatible with the refractory alloy, it is necessary that the chimney 142 be mechanically secured to the weldment 75-161-163-175.

To accomplish this purpose a circularly-cylindrical extension 214 (FIG. 12A) of nickel-chromium-iron alloy (typically INCONEL-600) is welded to the end of the upper stub 175. This alloy is weld compatible with the stainless steel of the stub 175 and has about the same thermal coefficient of expansion as the refractory nickel-chromium-iron alloy of the chimney 142. The extension 214 is a close tolerance fit to the chimney and because the thermal coefficients of expansion are nearly the same, this fit is maintained in the face of fluctuations in temperature and flow-induced vibrations are suppressed. INCONEL-600 has the following composition;

| | |
|---|---|
| Nickel plus Cobalt | 72.0 Min |
| Chromium | 14.0 – 17.0 |
| Iron | 6.0 –10.0 |
| Carbon | 0.15 Max |
| Manganese | 1.00 Max |
| Sulfur | 0.015 Max |
| Silicon | 0.50 Max |
| Copper | 0.50 Max |

In the above alloy the cobalt should be limited to 0.10% where, as here, the alloy is to be used within a reactor.

The extension 214 is welded to another extension 216 of stainless steel which is itself welded to the plate 165. The purpose of this extension 216 is to space the extension 214 sufficiently from plate 165 to reduce local bending moments at operating temperatures to acceptable levels. The extension 214 has a ledge 218 at the top. The ledge 218 engages the chimney 142 in a shoulder 505. Above the extension 214 there is a key 506, which is in the form of a split ring, and which tightly engages the chimney near its top in a groove. The key 506 has a ledge 224 penetrating into the groove. The key 506 is composed of the same alloy (INCONEL-718) and is held by a locking band 226 of the same alloy. A thermal liner 228 also of INCONEL-718 is held in place by the locking band 226. The mechanical joint 214-506-142 not only carries lateral loads but it also carries vertical loads both up and down. Up loads are carried by the ledge 218 of extension 214 and down loads by the ledge 224 of the key 506.

A lateral load pad is also provided between the lower stub 175 and the chimney 142. In this case, an extension 230 (FIG. 12B) of stainless steel is welded to the plate 169 and an extension 232 of the nickel-chromium-iron alloy which is weld compatible with the stainless steel and of the same thermal coefficient of expansion as the refractory alloy, is welded to the extension 230. The extension 232 is a close tolerance fit to the chimney 142.

Each opening 136 in the grid 138 forms a socket (FIGS. 12B and 14) for receiving the outlet nozzle (127 of the duct 121 for the fuel rod assemblies) of the duct whose effluent is channeled through the opening. FIG. 12B shows an opening 136 which receives the outlet nozzle 244 of the outer duct 137 of a control assembly. The control assembly also has an inner duct (not shown) which is movable through the outer duct. In this case, a socket 246 is doubled ended.

The socket 246 is a shell of the refractory nickel-chromium-iron alloy welded to the adjacent walls 248 of the grid 138. The socket 246 has a lower opening 250 to receive the nozzle 244. The shell also has an upper tapered opening 252 to receive the end 254 of a shell to which a flow tube 177 is attached. The end 256 of the flow tube 177 is seated in the rim of the shell 246. The shroud 179 (FIG. 1A) is attached to the flow tube 177. The shell 254 and the flow tube 177 are composed of the highly refractory alloy. The inner duct (not shown) of the control assembly is connected to a control assembly drive line 510 (FIG. 5A) and is movable along flow tube 177 and shroud 179 (FIG. 1A). The flow tube is aligned or centered in the chimney 142 by coaxial rings 262 and 264 (FIG. 11) and spider 266 all composed of the refractory nickel-chromium-iron alloy.

The modules 140 are enclosed in, and secured to, a shroud 135 (FIGS. 7, 8, 1B) composed of stainless steel (316). The shroud 135 is formed of a top plate coextensive with the plate 171 of the pair 163, a bottom annular plate 270 and inner and outer annular plates 272 and 274. The plate 171 whose extension serves as top plate is connected to the upper plate 169 of sandwich 163 by an annular plate 276 of the refractory alloy which is welded to plates 169 and 171. The keys 278 of stainless steel (316) are secured at positions spaced about 120° around the periphery of the shroud 135 between the top plate 171 and the bottom plate 270. Each key 278 engages a keyway 280 secured to the assembly 456, 120, 454 which is keyed to the core barrel 118 (FIGS. 18, 19, 20, 21) and the core. The upper internals 77 is thus firmly supported (movable vertically) through the columns 75 between and by the head plate 41 and the core barrel 118. In FIG. 1B a fragmentary section of the shroud 135 is shown in broken lines.

The core-component assemblies extend into the shroud. A peripheral seal 282 zone (FIGS. 7, 18, 19) extends around the periphery of the core 93 between the core outlet and the shroud 135. The seal zone 282 includes a plurality of abutting blocks 284 which extend over the second and third rows, radially outwardly, of the removable shielding assemblies 115 (See FIGS. 18, 19). The seal blocks 284 are secured to the bottom plate 270 of the shroud 135.

The lower internals 95 (FIG. 1B) is described in detail in the Pennell and Rylatt applications. The internals 95 include a plate 191 in the form of an inverted truncated cone which is welded integrally with the vessel 221. The core barrel 118 is welded to the periphery of the horizontal plate 193 of this support.

A liner 203 (FIG. 1B) is slidably mounted in openings in the plate 193. The liner is of generally hollow cylindrical form. From the bottom of the liner 203 a flow-distribution and blockage-prevention disc 205 is suspended into the inlet plenum 25. The liner 203 is suspended from the top of plate 193 by a collar 207 which is screwed into and welded to the liner 203 and engages the plate 193 along a recess about the corresponding opening in plate 193.

An inlet modular unit 221 is removably mounted in each of the liners 203. The modular unit 221 may be of different types and the type which is mounted in a liner 203 in any position of plate 193 depends on the purpose which it is to serve. Some units 221 receive fuel assemblies 103 or 107 or control-rod assemblies 117 or 119 which require high fluid-cooling flow; other units receive blanket assemblies 111 or removable shielding assemblies, 115. Assemblies 103, 107, 117 or 119 are plugged into the inlet modules 21. Each assembly, as the case may be, has a greater specific gravity than the coolant fluid. Because the pressure above and below the assembly is balanced, the assembly remains in its receptacle under its own weight. The inlet modules 221 are mounted in the liners 203 in seals so that the pressure above and below the modules 221 is balanced. Leakage through the seals is carried to the outer region of the vessel 21 through vent pipes 275.

While a preferred embodiment has been disclosed herein, many modifications thereof are feasible. This invention is not to be restricted except insofar as is necessitated by the spirit of the prior art.

What we claim is:

1. A nuclear reactor including a vessel having therein a nuclear core, said core having a plurality of fuel-component assemblies, and an inlet plenum below said core and an outlet plenum above said core, said reactor also including means for supplying a coolant between said inlet plenum and said outlet plenum, said coolant being conducted separately through said assemblies from the inlet plenum to the outlet plenum and exiting said assemblies at a temperature at or in excess of 800° F, the coolant emitted from adjacent assemblies being at substantially different temperatures, the said reactor also including upper internals including supporting means for the upper components of said reactor, the said upper internals also including a plurality of passive outlet modules for conducting said coolant from said adjacent assemblies emitting coolant at substantially different temperatures to said outlet plenum, said plurality of modules substantially forming a continuum above a selected plurality of the fuel component assemblies, each said module being disposed to conduct, mix, and substantially confine the coolant emitted from a subplurality of said assemblies so as to equalize the temperature of the coolant emitted from said subplurality prior to discharge to said outlet plenum, each said module including a grid disposed within said module having a plurality of openings therein each disposed to receive the coolant from an assembly of said last-named subplurality, each opening sized so as to provide peripheral engagement to each respective one of said assemblies, there being one said opening for each respective assembly of said subplurality said grid spaced a predetermined distance from said last-named assembly so as to provide a backup hold-down for said last-named assembly, the said last-named module also including means, interposed between said grid and said outlet plenum for substantially confining the coolant from said last-named subplurality in the region between the outlet of said core and said outlet plenum to a generally vertical path, said modules thereby reducing the effect of thermal stripping on the remainder of the upper internals.

2. The reactor of claim 1 wherein the subplurality of the assemblies whose coolant is conducted by at least certain of said outlet modules includes a central assembly whose emitted coolant is at a lower temperature surrounded by peripheral assemblies whose emitted coolants are at substantially higher temperatures.

3. The reactor of claim 2 wherein the central assembly is a control rod assembly and the peripheral assemblies are fuel assemblies.

4. The reactor of claim 1 wherein the subplurality of the assemblies whose coolant is conducted by at least certain of said outlet modules includes a first number of assemblies whose emitted coolants are at higher temperatures and a second number of assemblies whose emitted coolants are at substantially lower temperatures.

5. The reactor of claim 4 wherein the first number of assemblies are fuel assemblies and the second number of assemblies are blanket assemblies, said second number being substantially higher than said first number.

6. The reactor of claim 1 wherein each module is composed of an Inconel alloy.

7. The reactor of claim 6 wherein the Inconel alloy has substantially the following composition in weight percent:

| | |
|---|---|
| Nickel | 50.00 – 55.00 |
| Chromium | 17.00 – 21.00 |
| Columbium (plus) Tantalum | 4.75 – 5.50 |
| Molybdenum | 2.80 – 3.30 |
| Titanium | 0.65 – 1.15 |
| Aluminum | 0.20 – 0.80 |
| Cobalt | 1.00 Max. |

-continued

| | |
|---|---|
| Carbon | 0.08 Max. |
| Manganese | 0.35 Max. |
| Silicon | 0.35 Max. |
| Phosphorus | 0.015 Max. |
| Sulfur | 0.015 Max. |
| Boron | 0.006 Max. |
| Copper | 0.30 Max. |
| Iron | Balance. |

* * * * *